United States Patent
Knotts

Patent Number: 6,135,252
Date of Patent: Oct. 24, 2000

[54] SHOCK ISOLATOR AND ABSORBER APPARATUS

[76] Inventor: Stephen E. Knotts, 417 - 173rd Pl. NE., Bellevue, Wash. 98008

[21] Appl. No.: 09/222,328

[22] Filed: Dec. 29, 1998

Related U.S. Application Data

[63] Continuation of application No. 08/740,979, Nov. 5, 1996, Pat. No. 5,875,875.

[51] Int. Cl.⁷ ........................................... F16F 7/12
[52] U.S. Cl. ............................................ 188/374; 188/268
[58] Field of Search ........................... 188/268, 371–377; 267/140, 152, 293; 293/133, 134, 136

[56] References Cited

U.S. PATENT DOCUMENTS

| | | |
|---|---|---|
| 2,997,325 | 8/1961 | Peterson . |
| 3,176,972 | 4/1965 | Deschuer . |
| 3,365,189 | 1/1968 | Carlson ................................. 188/268 |
| 3,380,557 | 4/1968 | Peterson ............................... 188/374 |
| 3,556,268 | 1/1971 | Fister . |
| 3,583,530 | 6/1971 | De Venne . |
| 3,690,423 | 9/1972 | Trongeau ............................. 188/268 |
| 3,747,915 | 7/1973 | Hall ...................................... 293/133 |
| 3,833,093 | 9/1974 | Robinson . |
| 3,840,097 | 10/1974 | Holley ................................. 188/287 |
| 3,847,252 | 11/1974 | Casciola . |
| 3,913,707 | 10/1975 | Wastenson et al. . |
| 3,968,862 | 7/1976 | Gorges et al. ....................... 188/374 |
| 3,968,863 | 7/1976 | Reilly . |
| 4,057,129 | 11/1977 | Hennells . |
| 4,085,832 | 4/1978 | Gaines et al. . |
| 4,317,373 | 3/1982 | Goes et al. . |
| 5,351,791 | 10/1994 | Rosenzweig ......................... 188/372 |
| 5,782,710 | 7/1998 | Kosik et al. . |
| 5,875,875 | 3/1999 | Knotts ................................. 188/374 |

FOREIGN PATENT DOCUMENTS

| | | |
|---|---|---|
| 2212685 | 9/1973 | Germany . |
| 1456654 | 2/1989 | U.S.S.R. . |

Primary Examiner—Christopher P. Schwartz
Attorney, Agent, or Firm—Brinks Hofer Gilson & Lione

[57] ABSTRACT

Apparatus and methods for isolating and absorbing energy associated with shock forces that are exerted upon an object, such as the energy attendant to shock forces experienced during and immediately following a mild to severe impact. The apparatus generally having: (a) a housing defining an enclosure; (b) at least one segment of non-liquid material contained within the enclosure; and (c) a piston placed within the enclosure. When the shock or impact force is applied to either the piston or housing, the piston urges the non-liquid material to pass or extrude through an aperture, orifice, channel or slot located either within the piston or the housing. The non-liquid material passes or extrudes through the aperture, orifice, channel or slot in a direction that is generally transverse to the relative movement of the piston within the enclosure. The passage or extrusion of the non-liquid material through the aperture, orifice, channel or slot absorbs or dissipates at least a portion of the energy attendant to the shock or impact force.

6 Claims, 21 Drawing Sheets

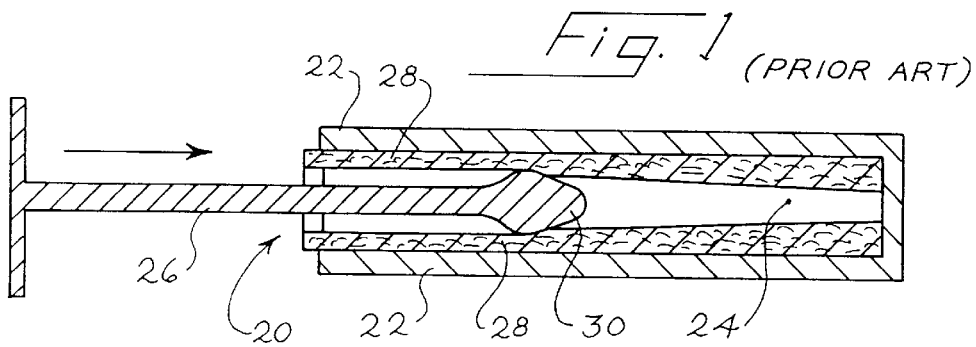
Fig. 1 (PRIOR ART)
Fig. 1A
PLASTIC PRESSURE
STATION LOCATION
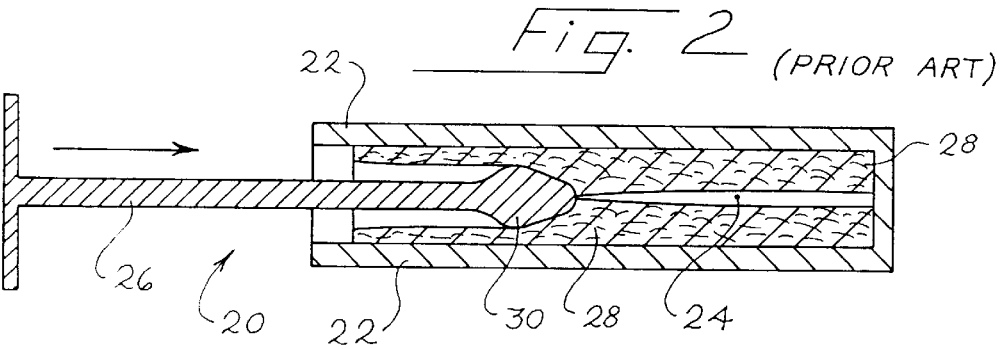
Fig. 2 (PRIOR ART)
Fig. 2A
PLASTIC PRESSURE
STATION LOCATION

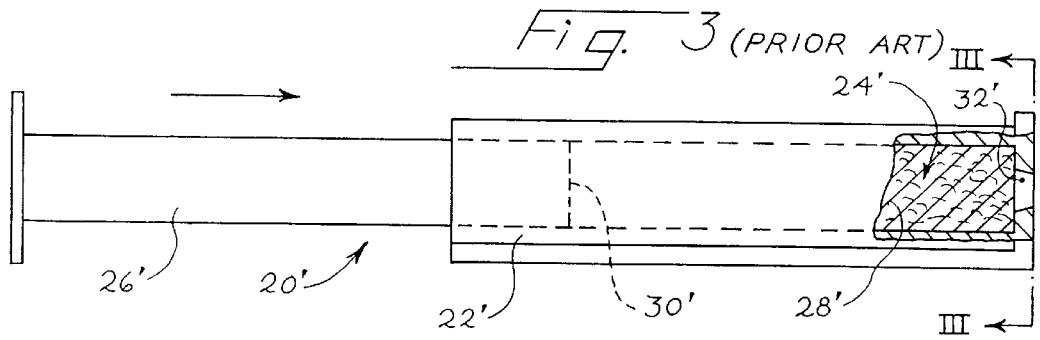
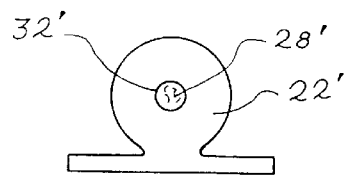
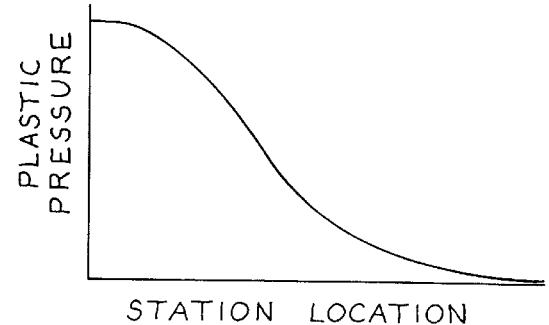
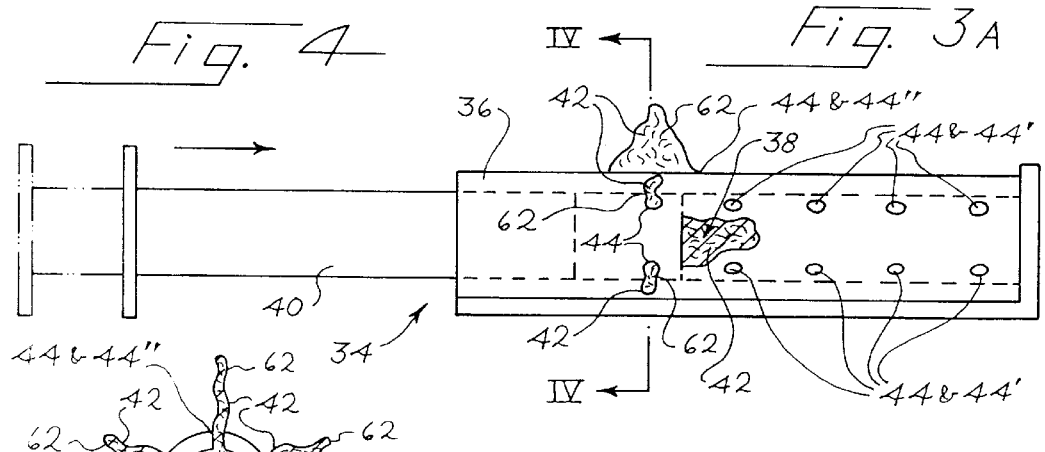
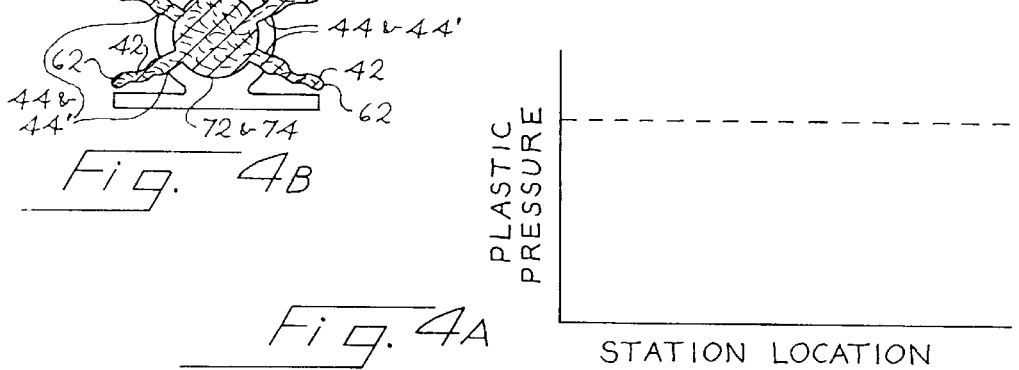

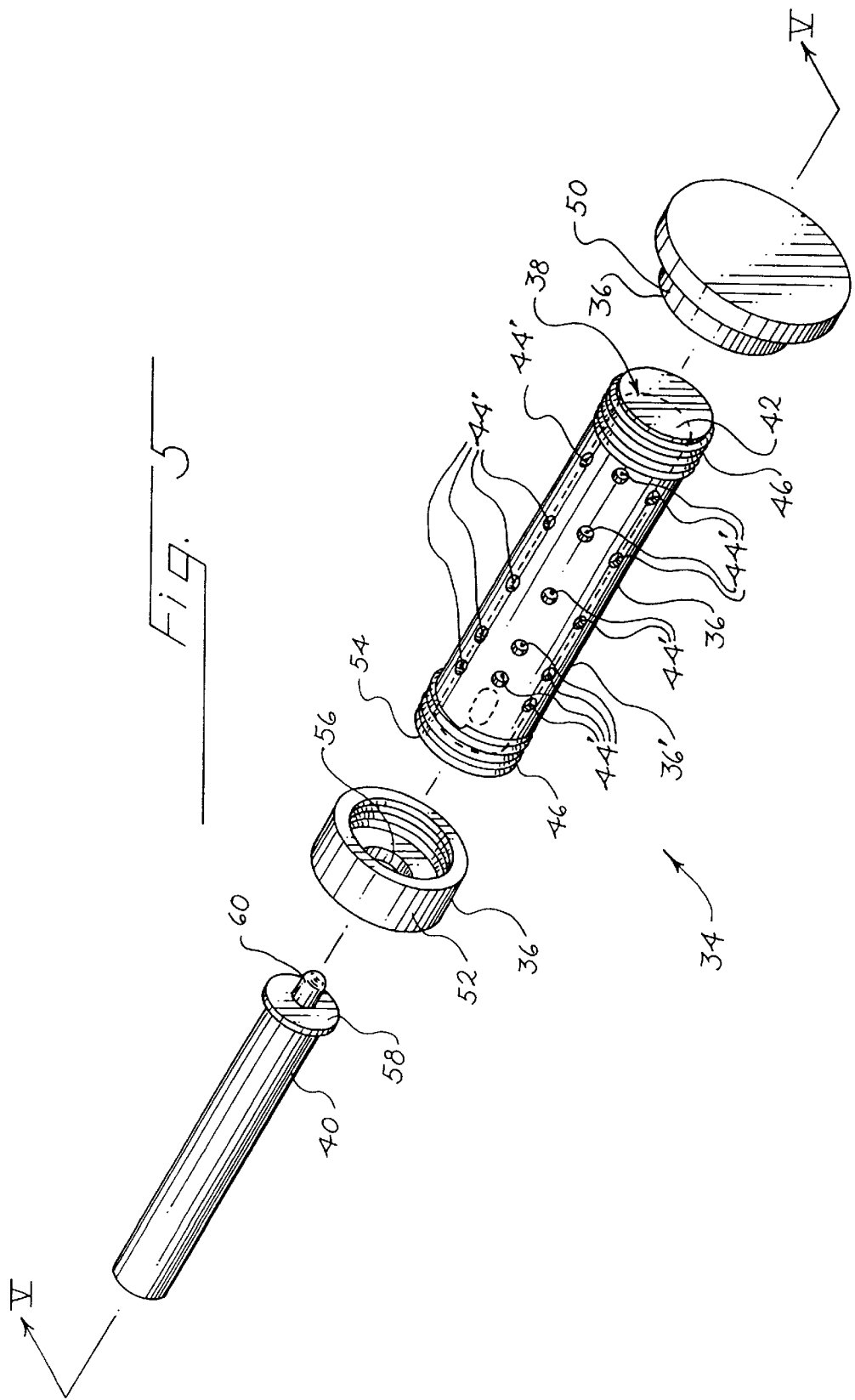

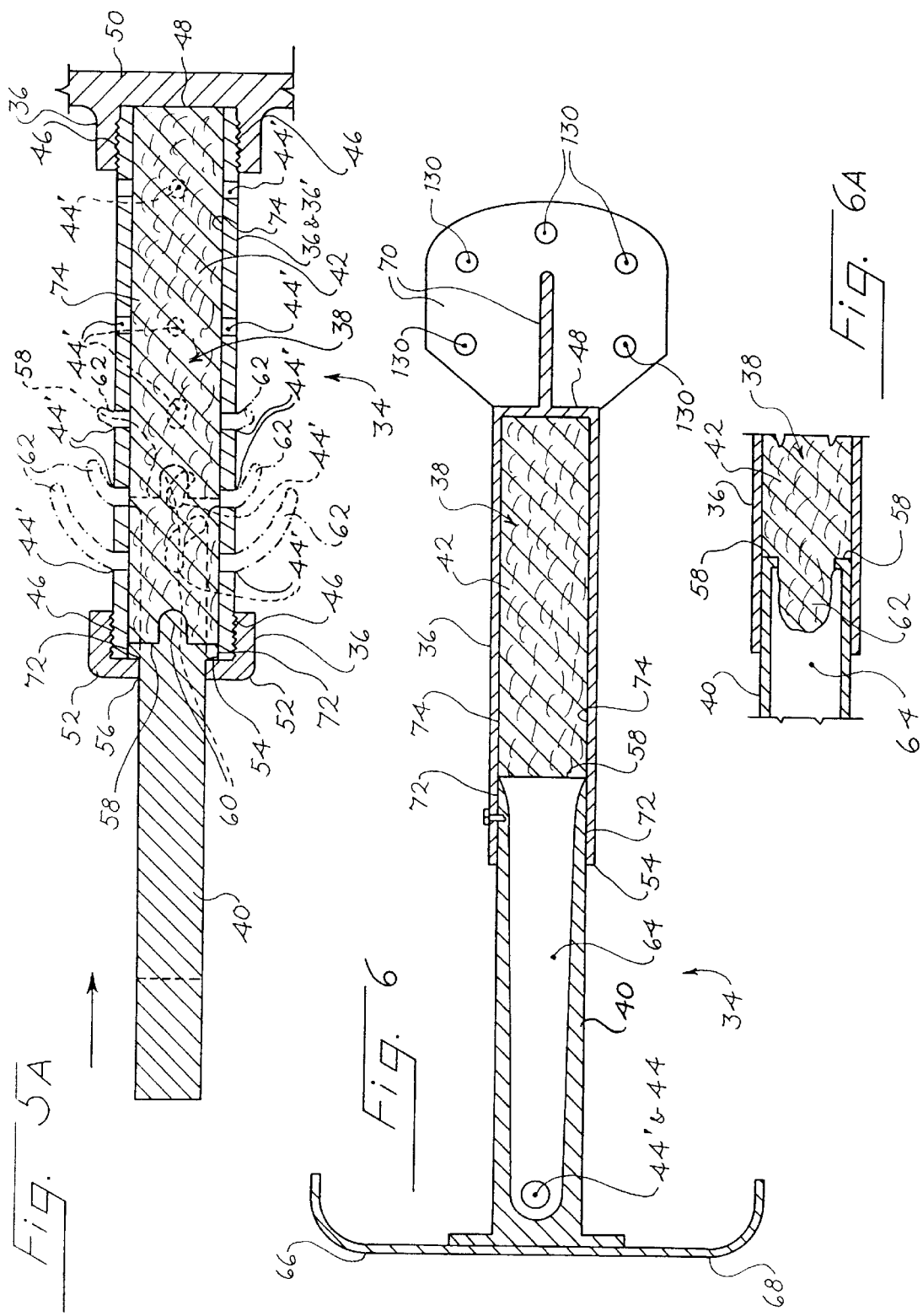

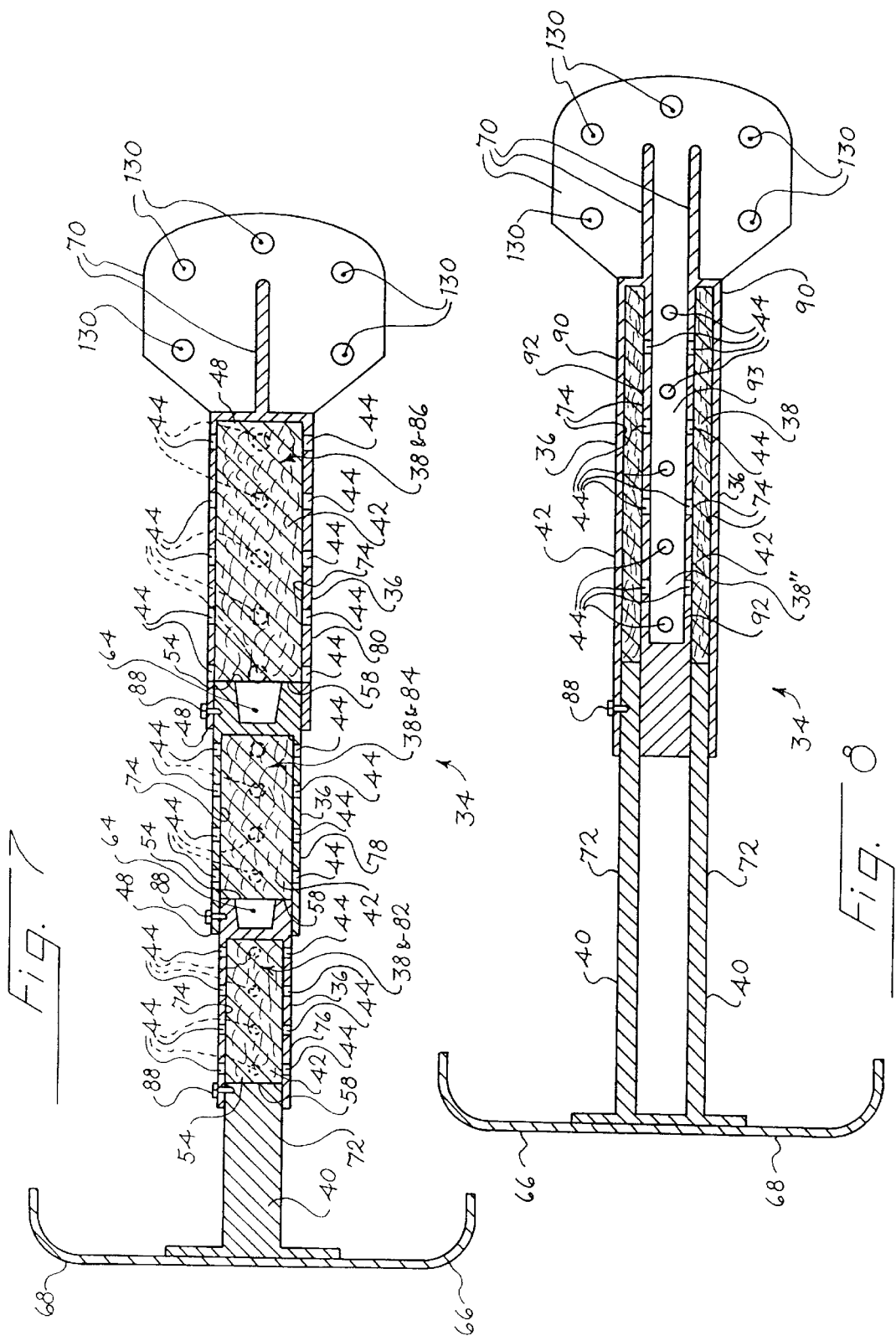

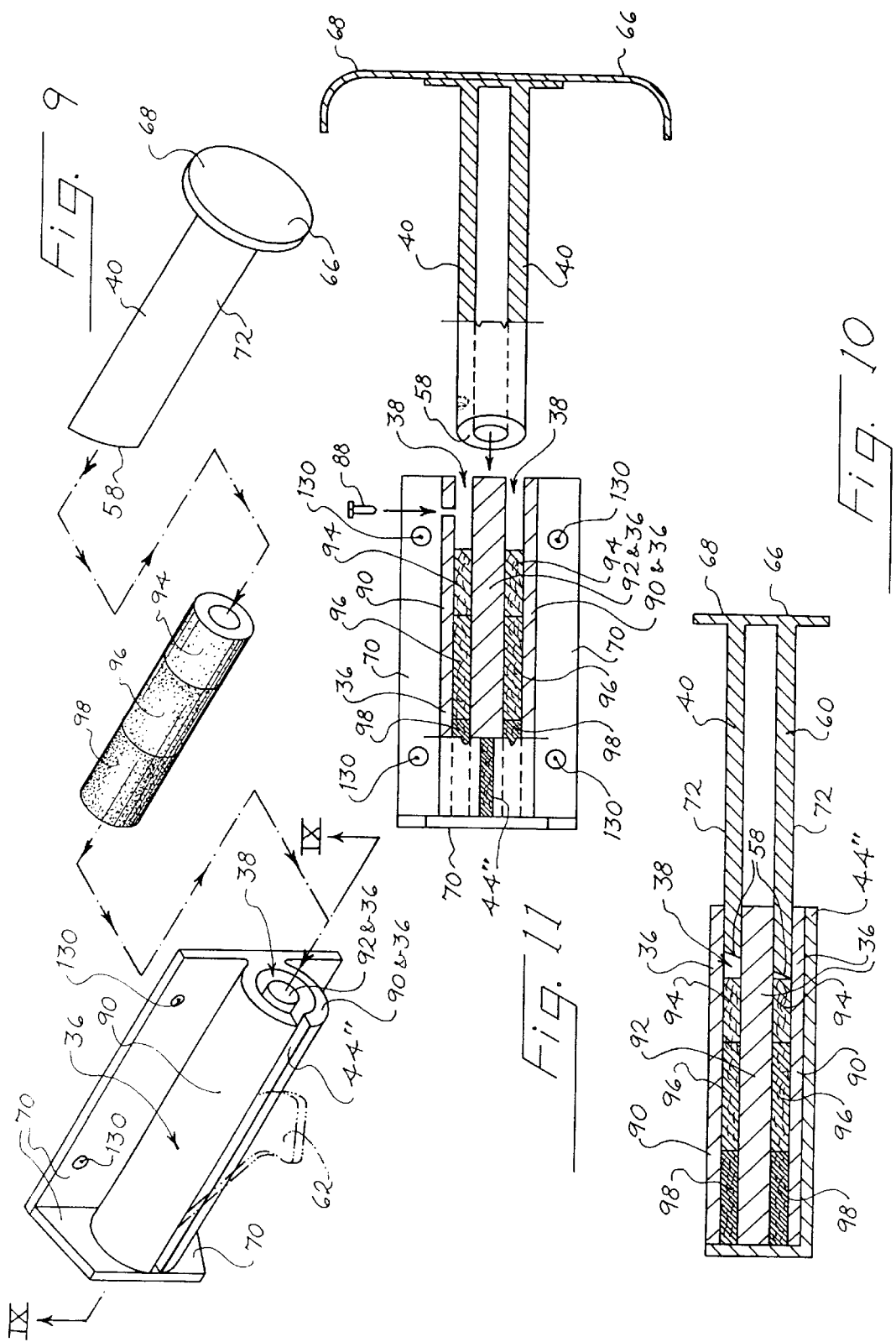

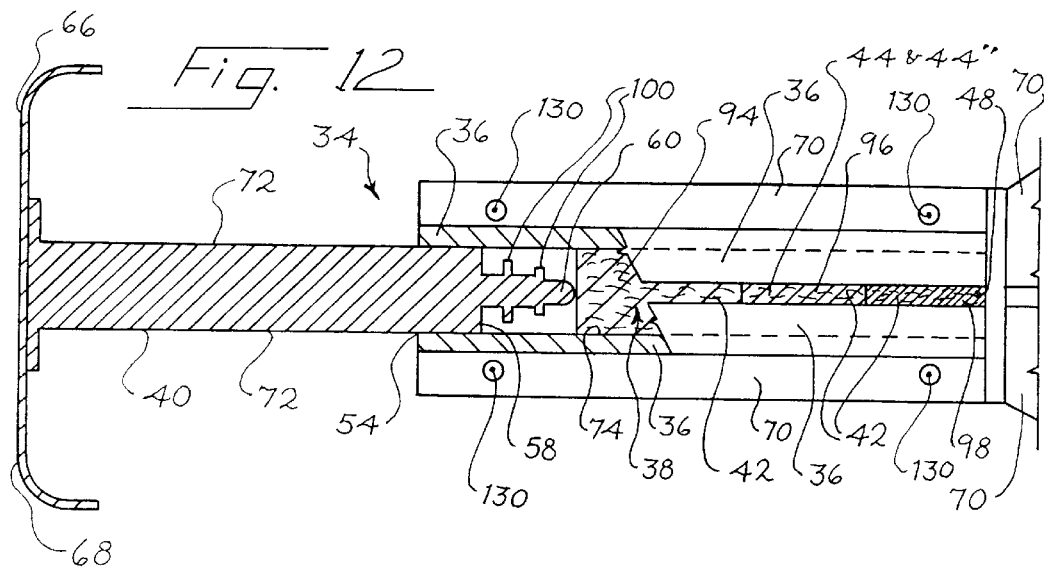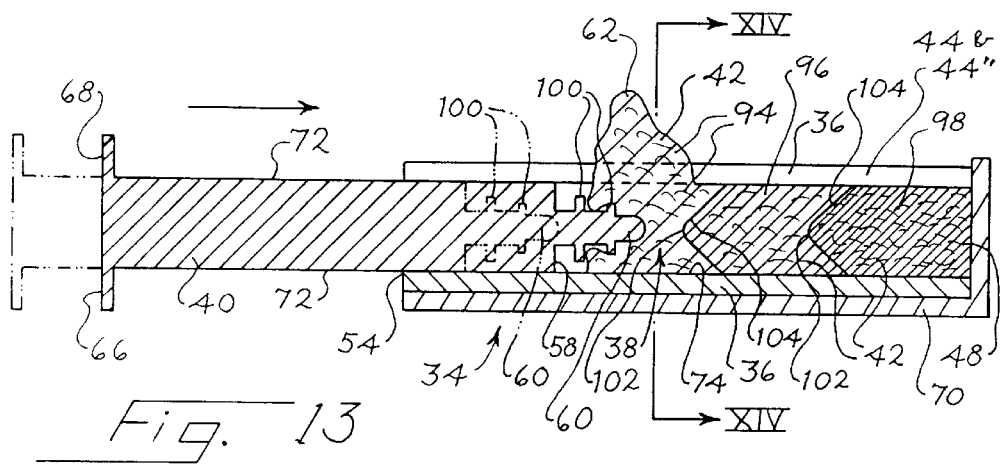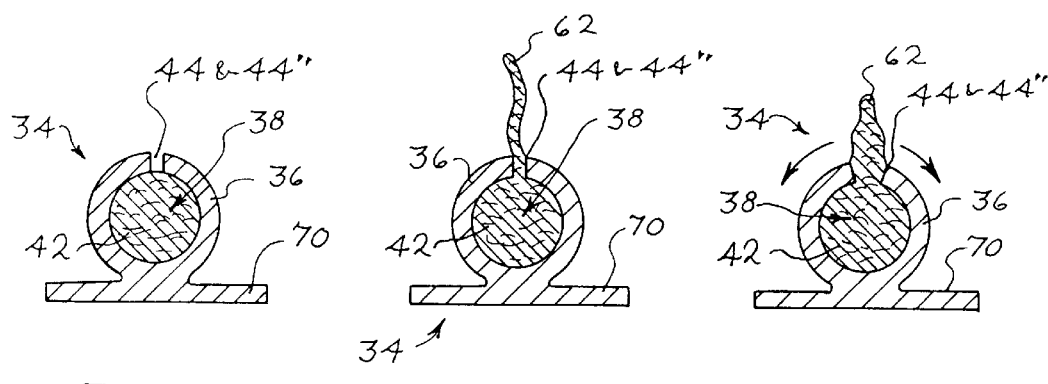

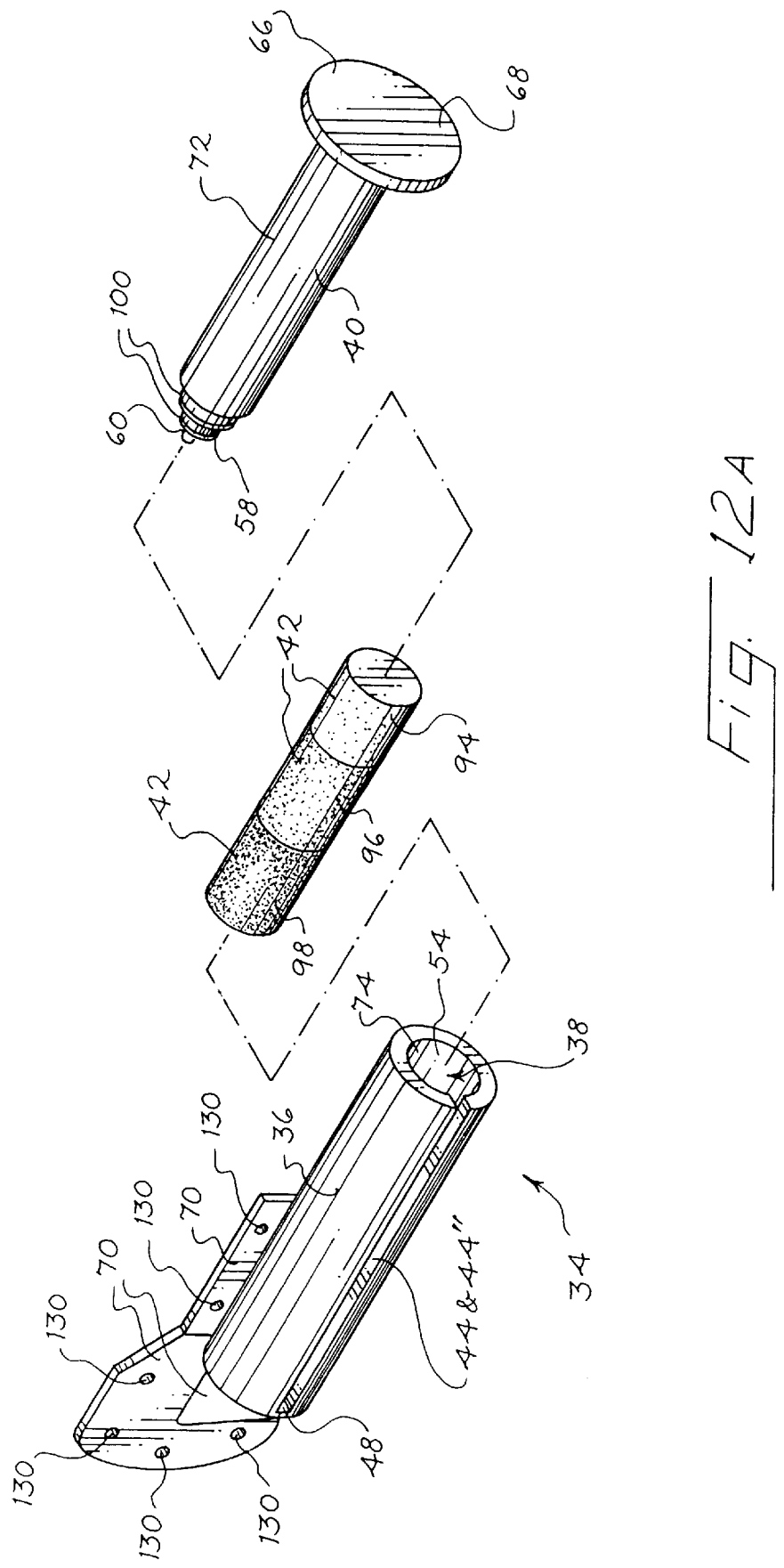

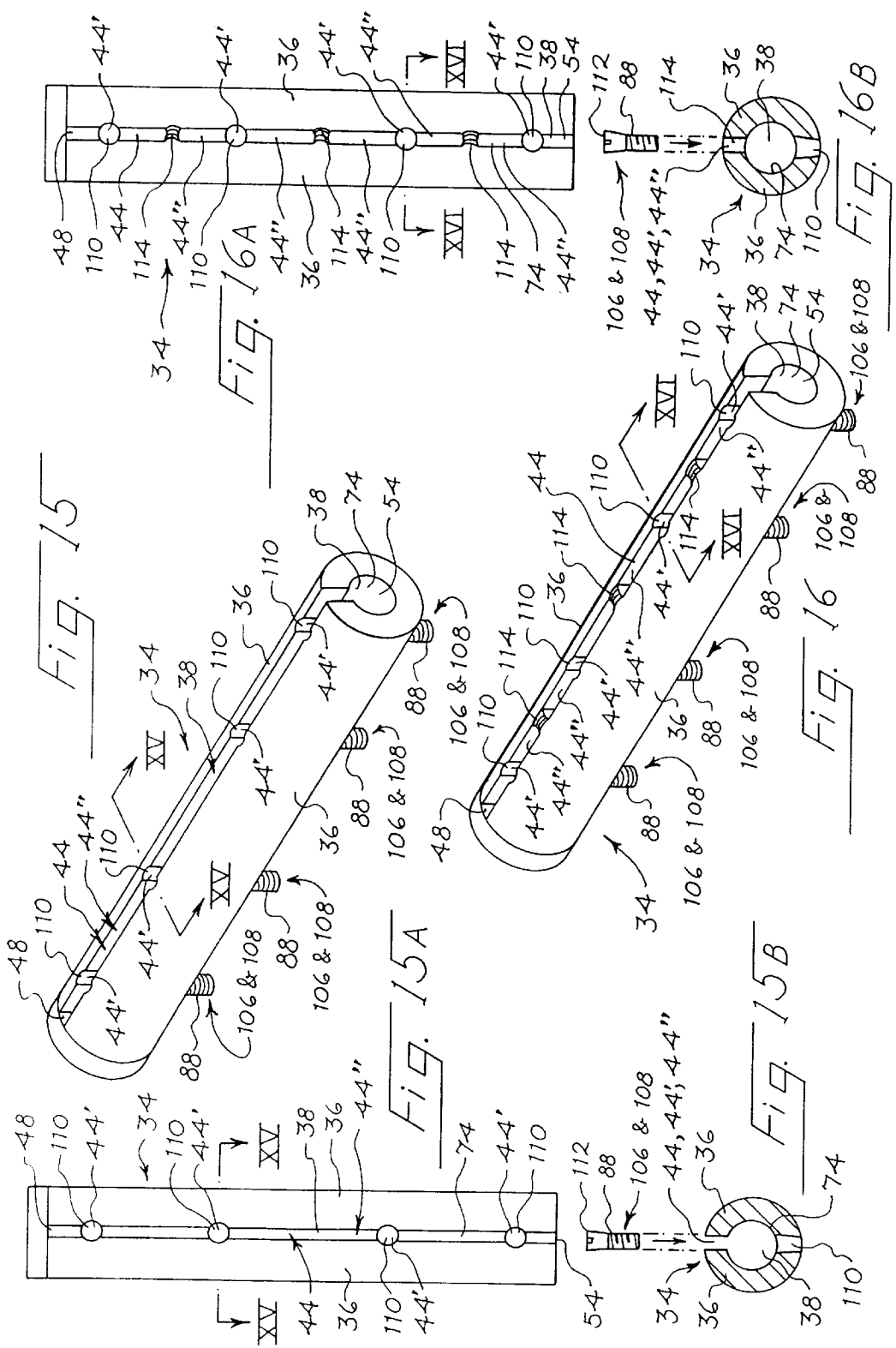

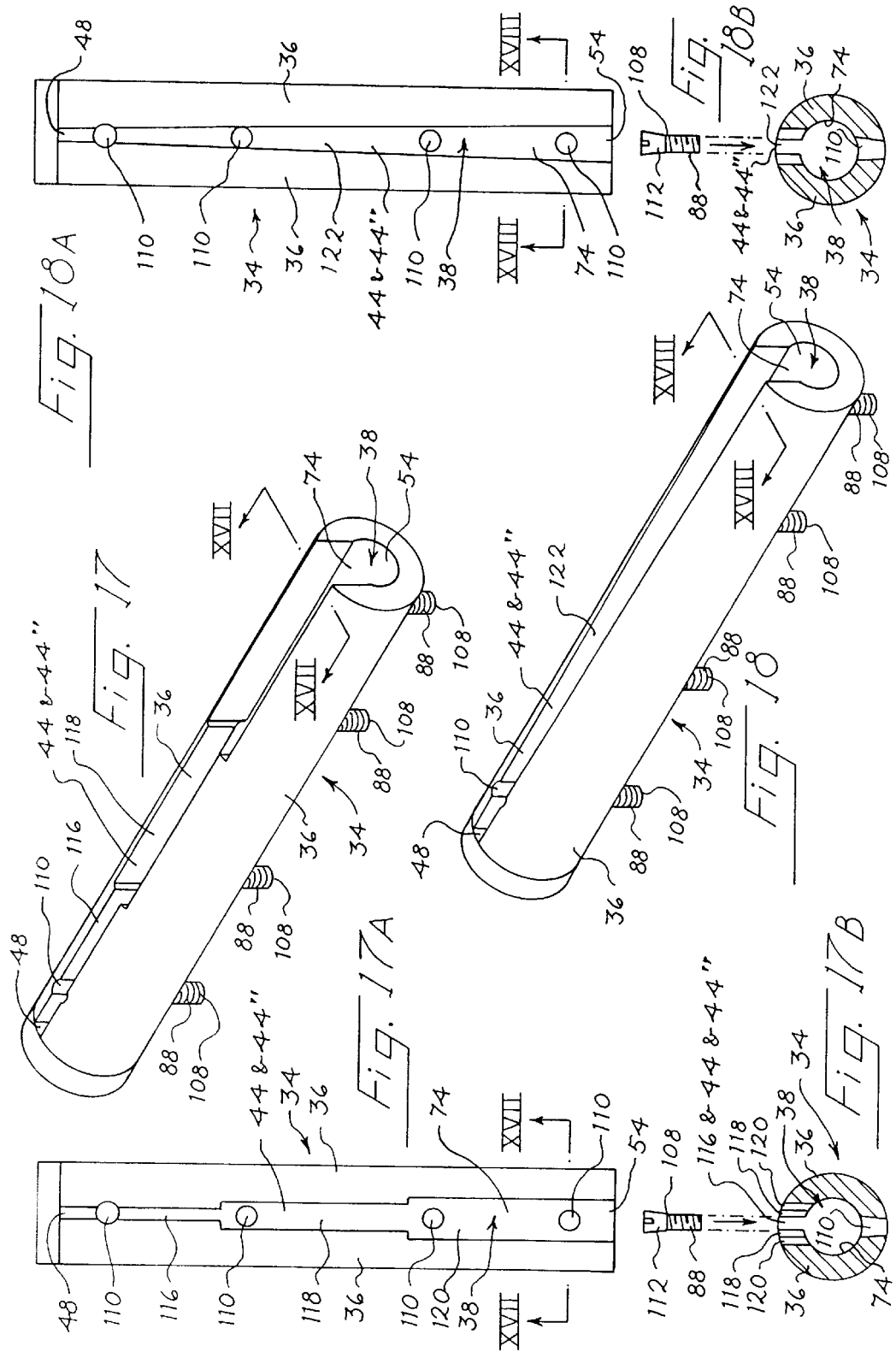

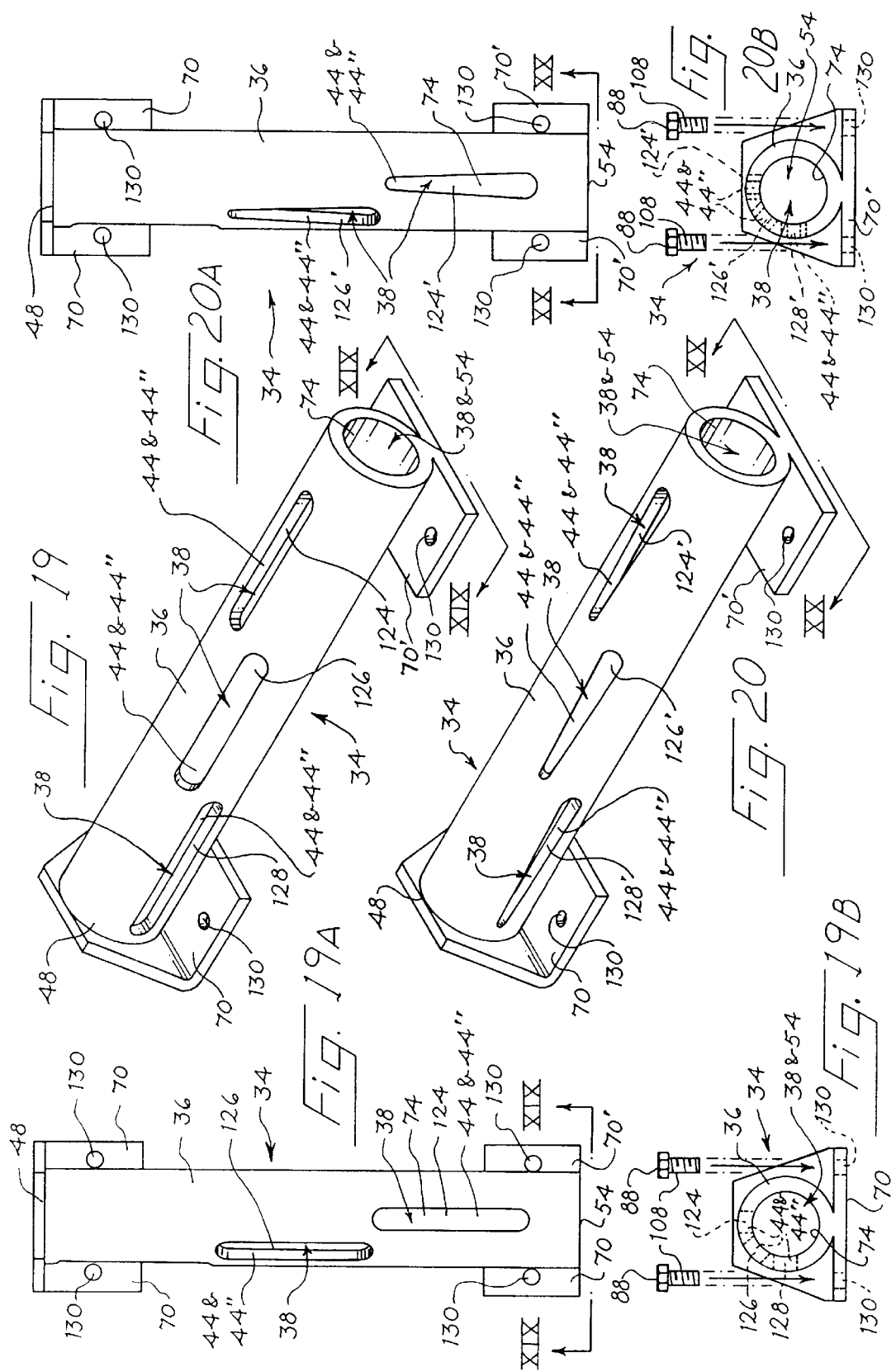

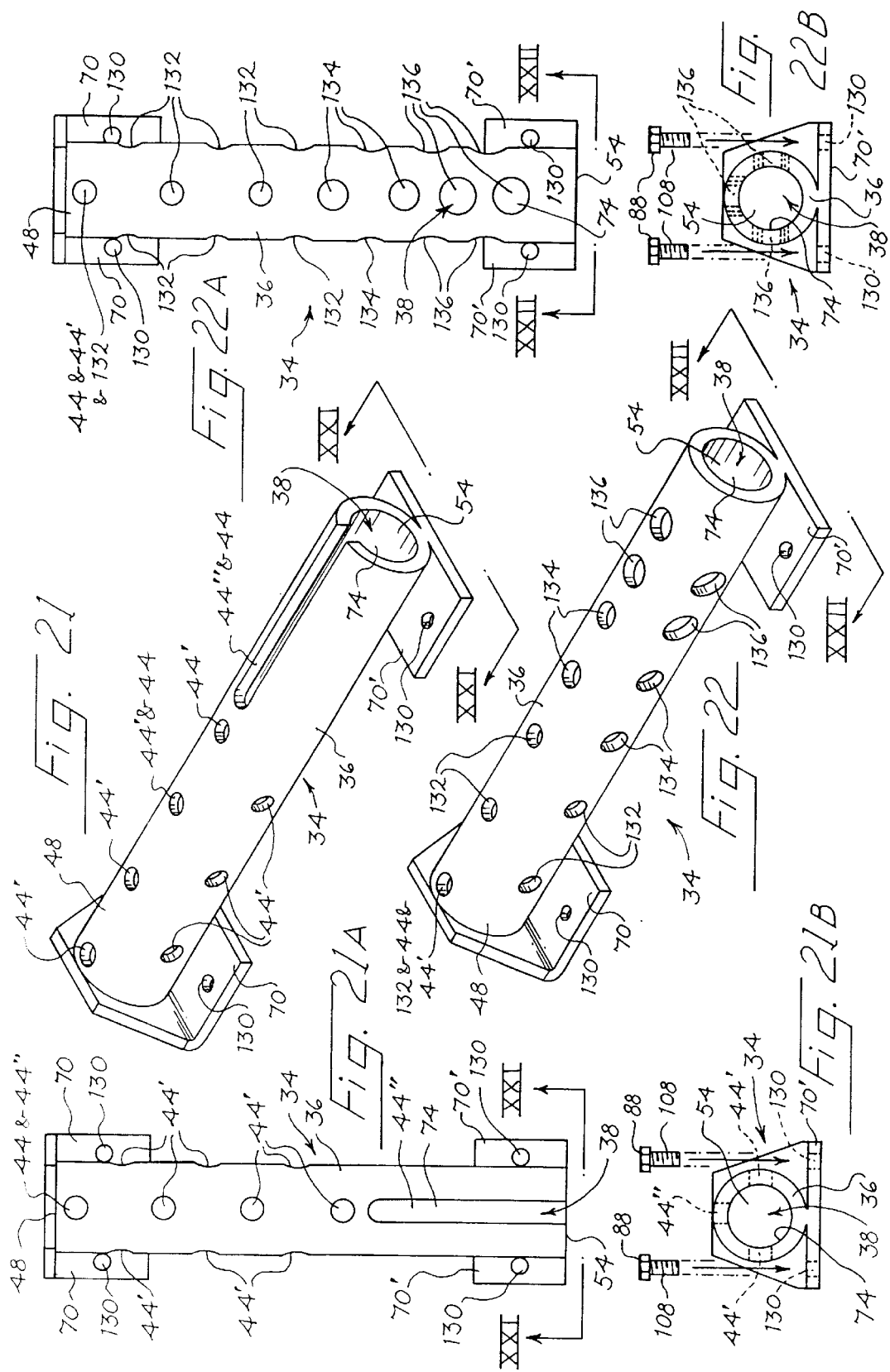

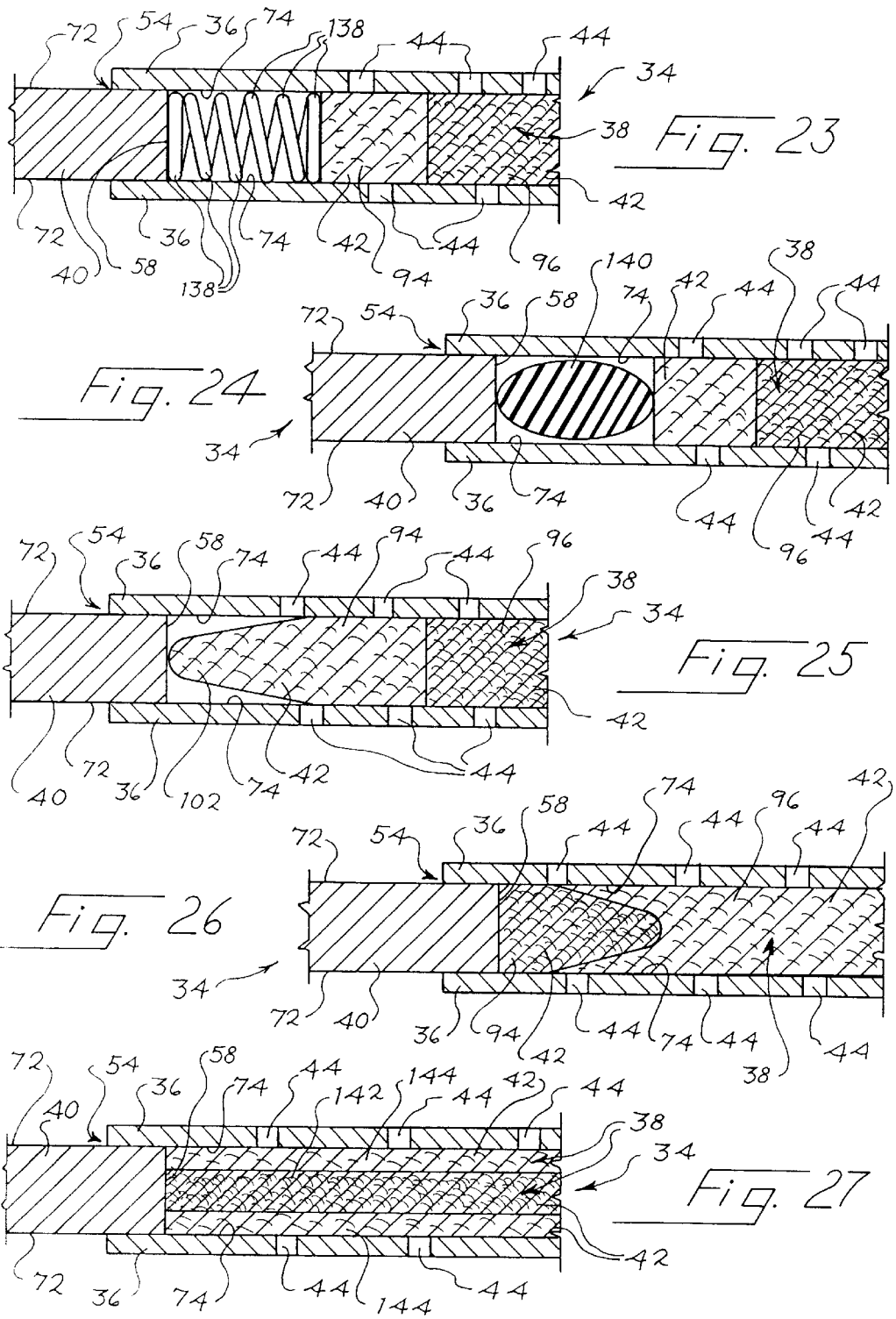

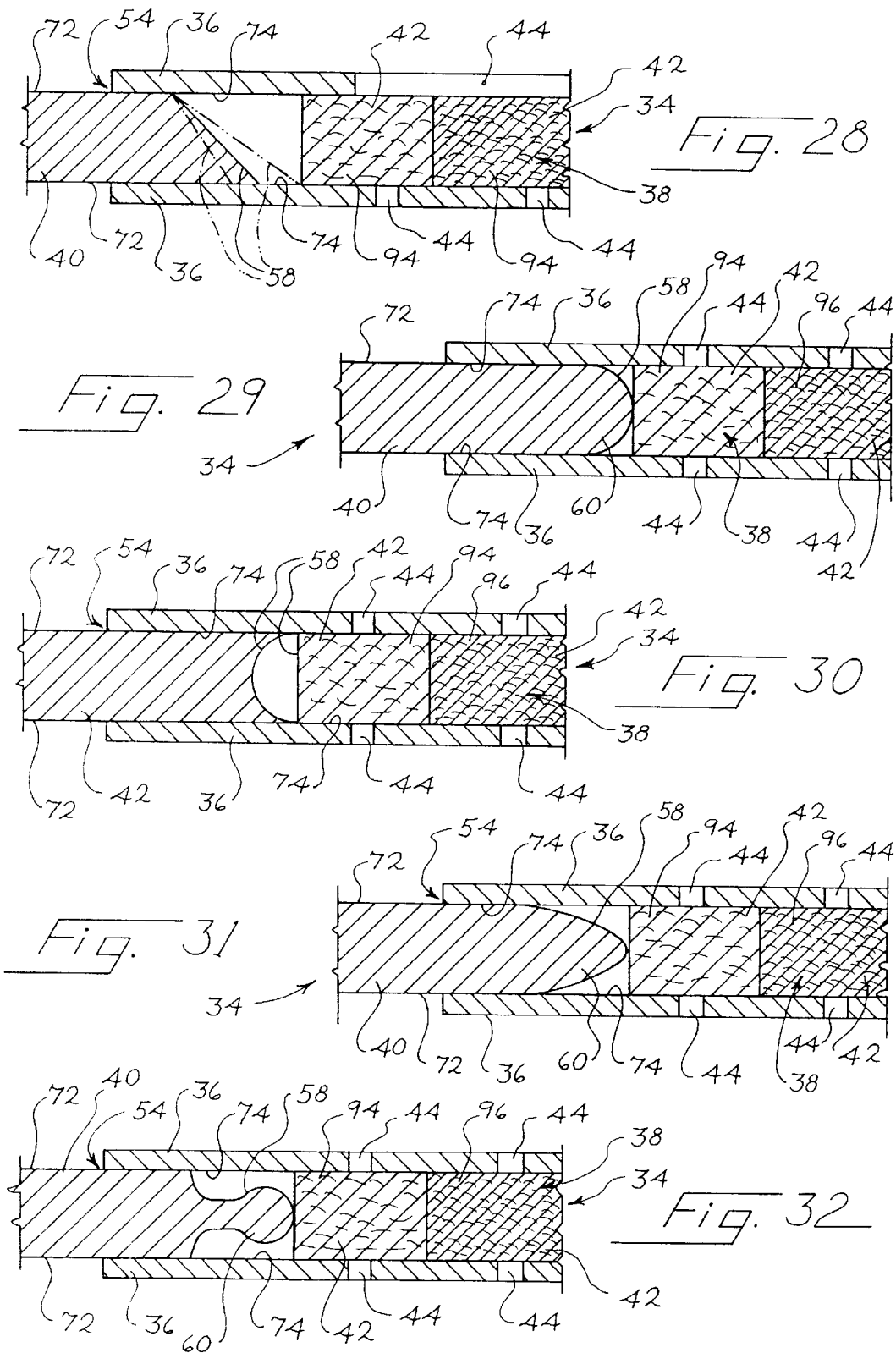

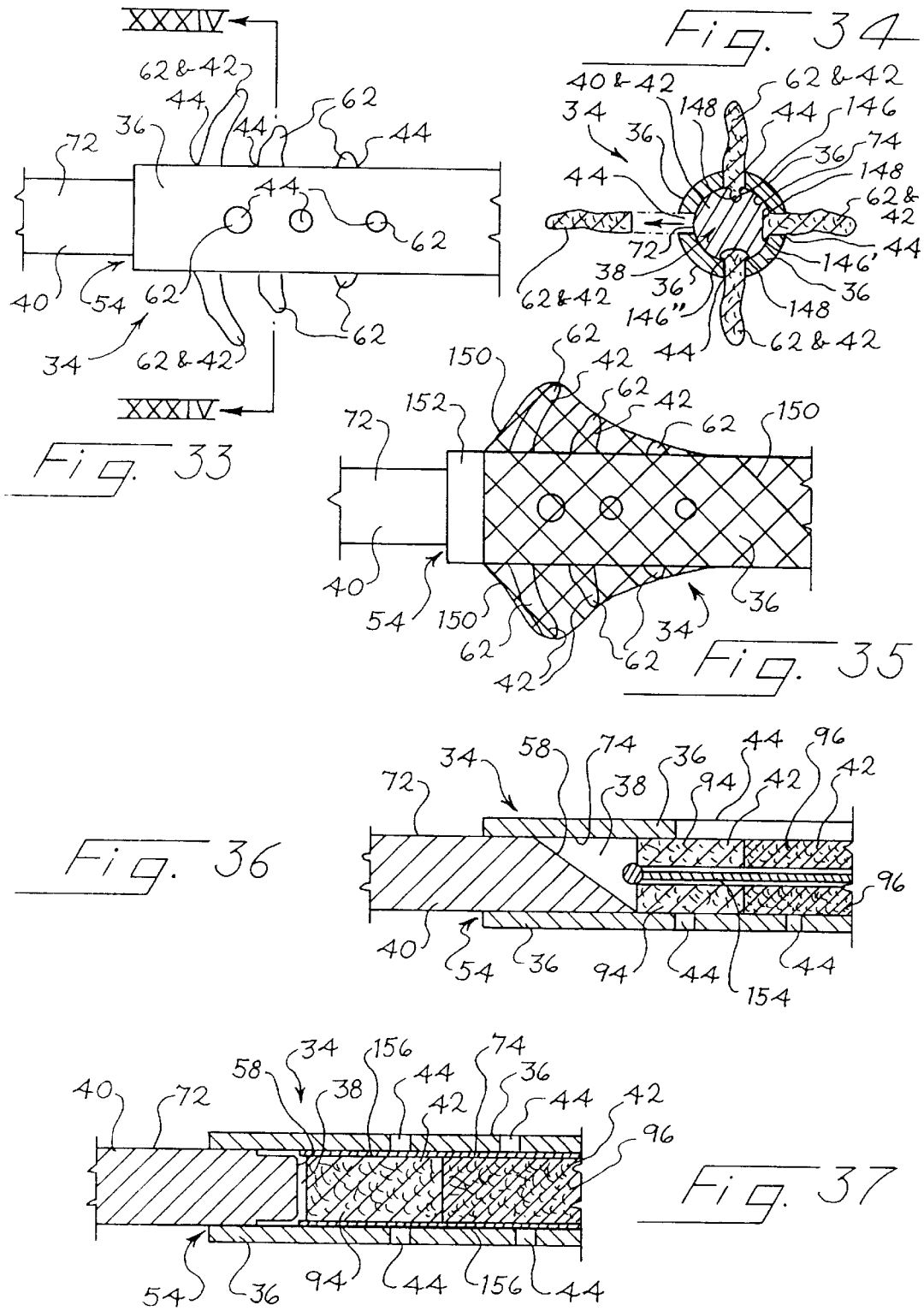

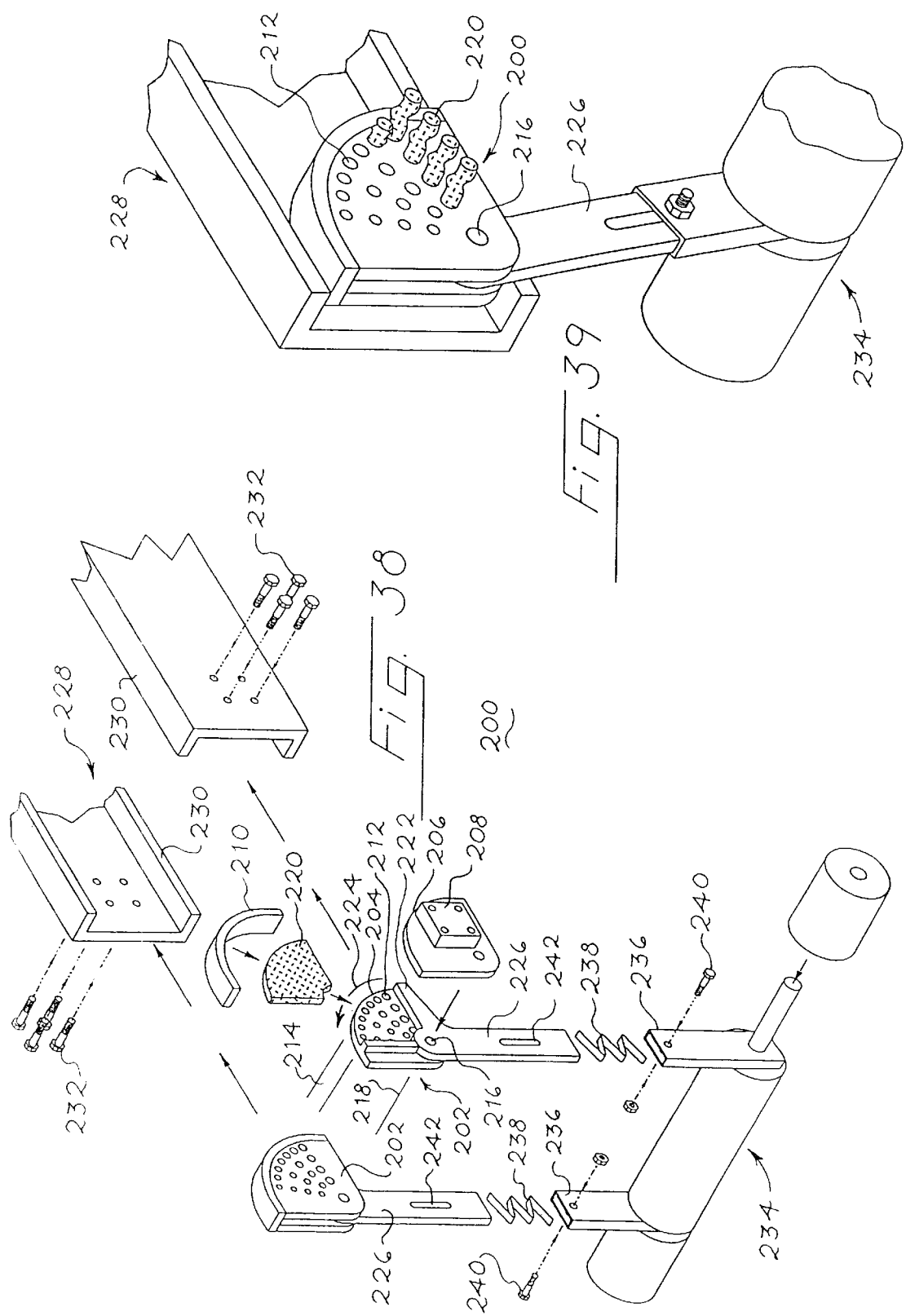

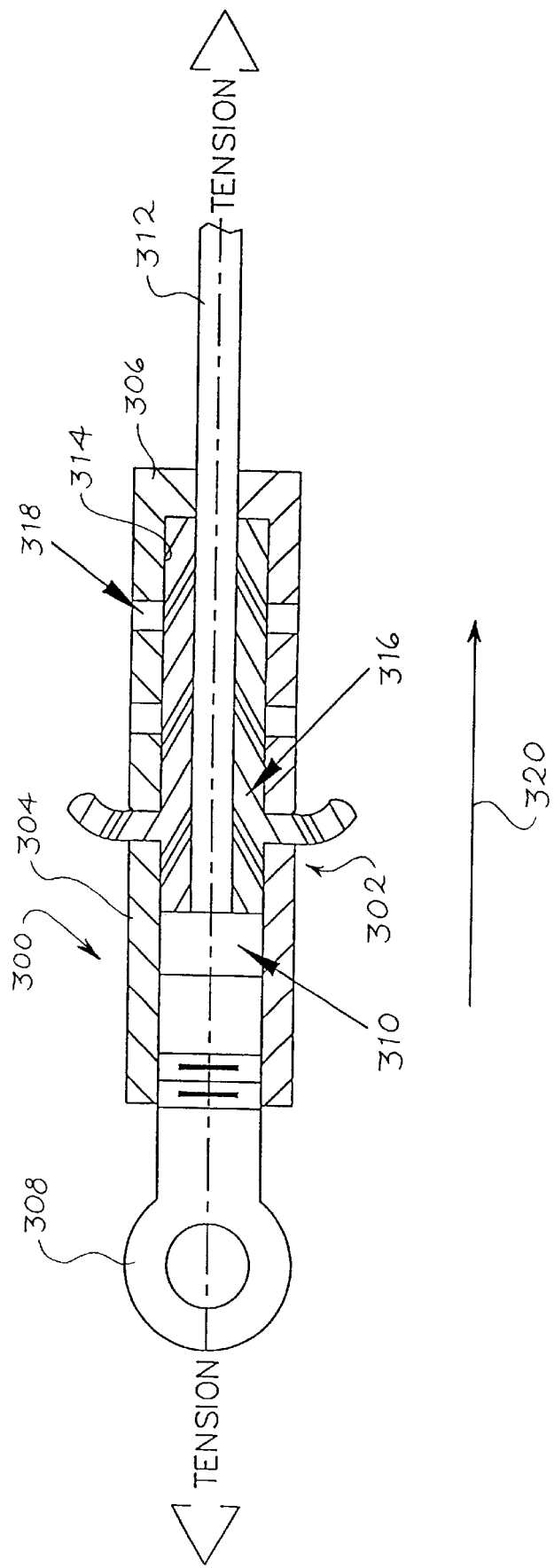

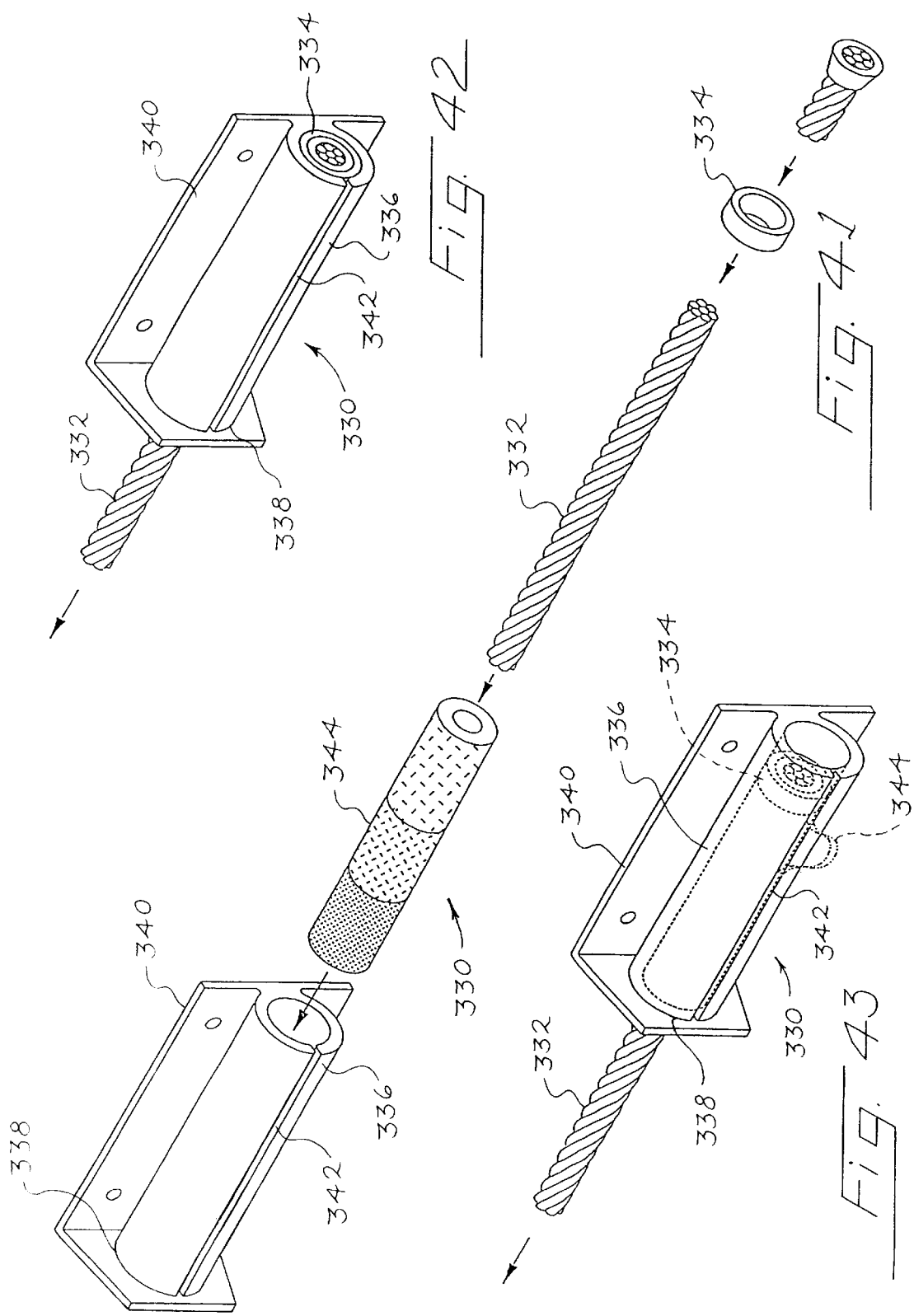

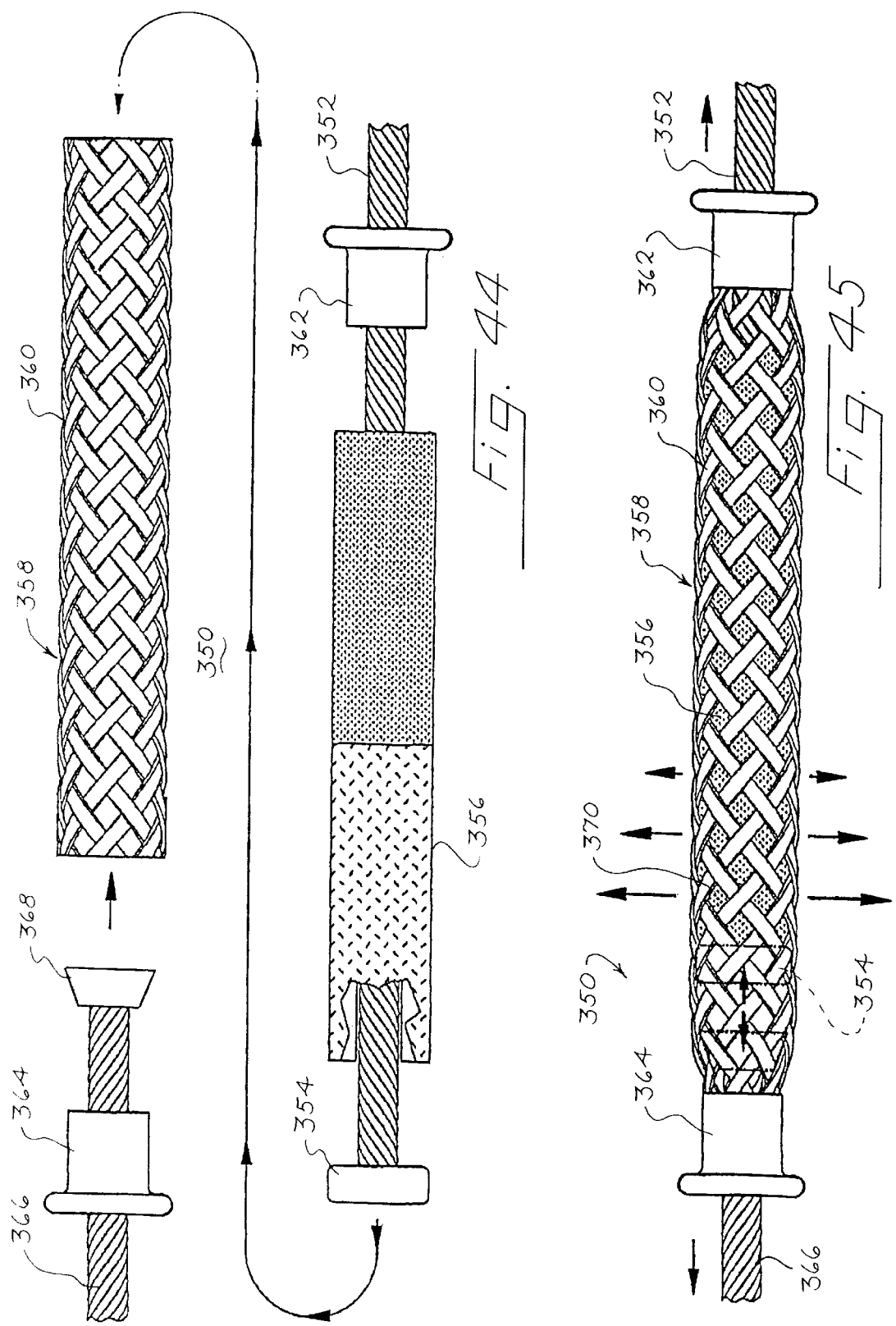

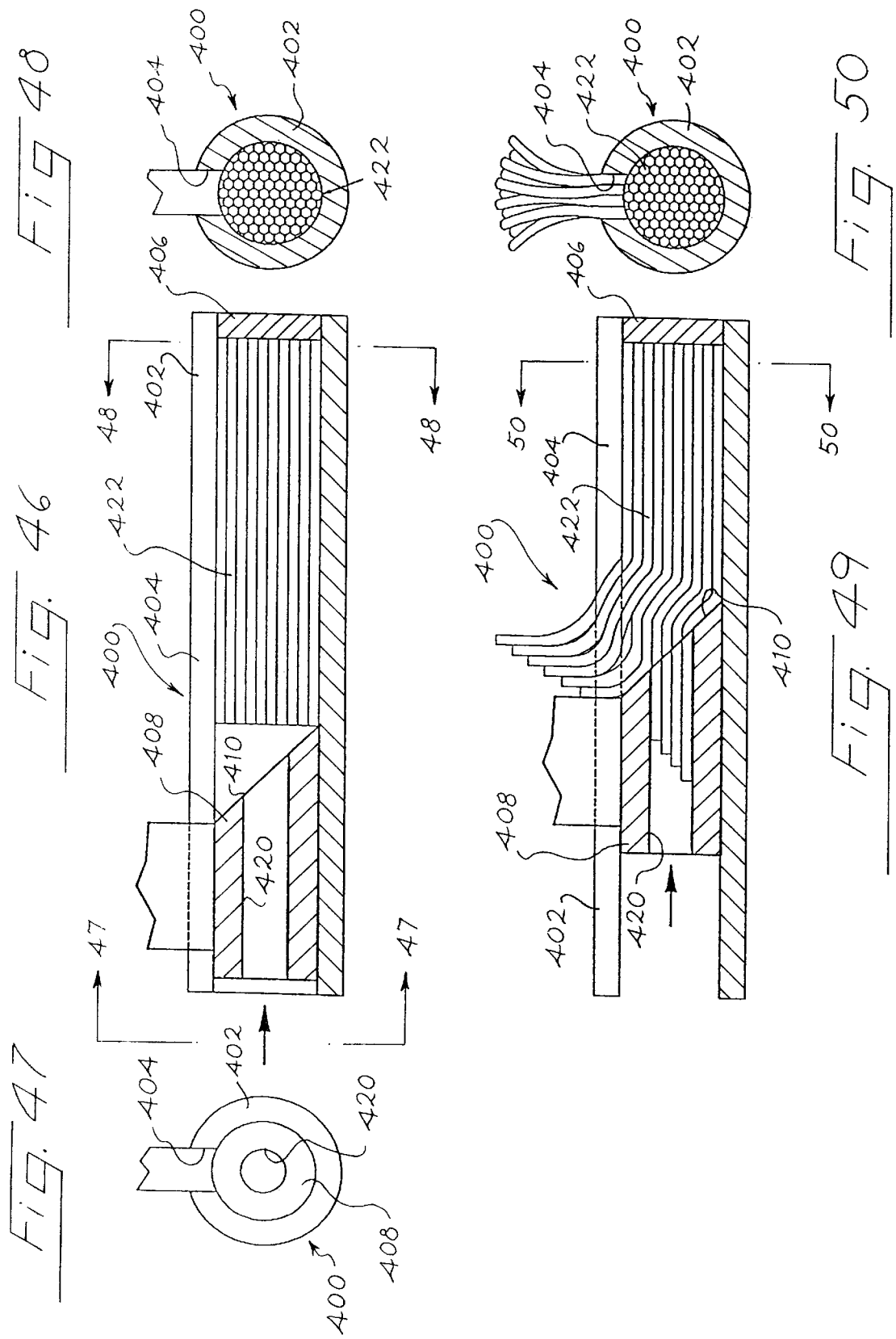

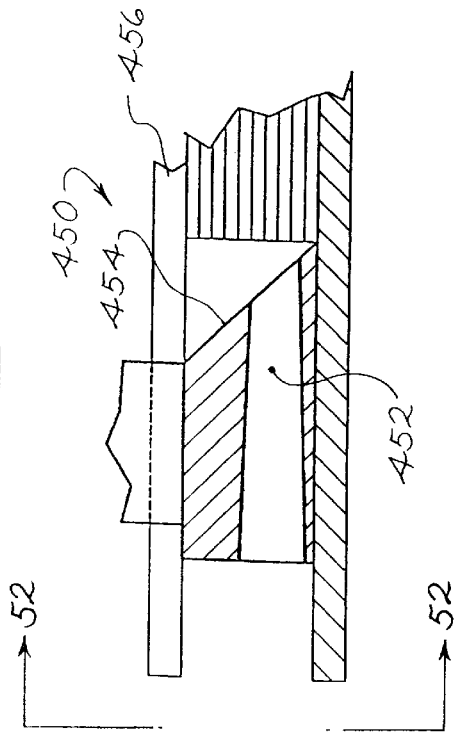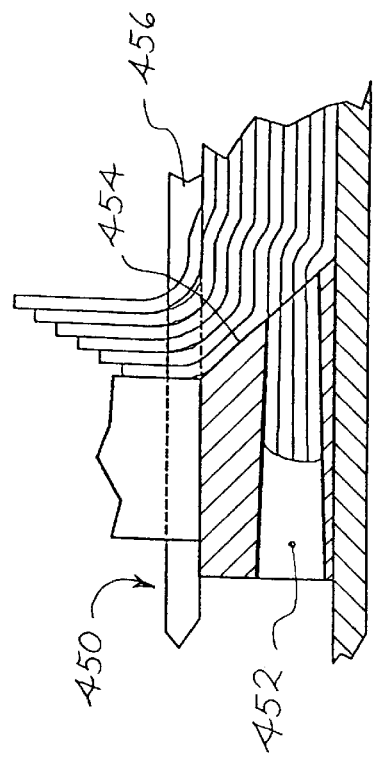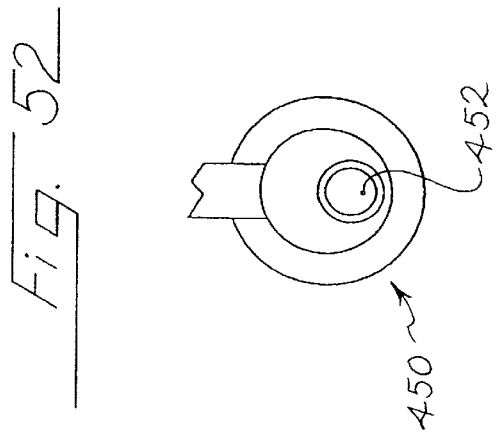

SHOCK ISOLATOR AND ABSORBER APPARATUS

CROSS REFERENCE TO RELATED APPLICATION

This application is a continuation in part of U.S. patent application Ser. No. 08/740,979, filed Nov. 5, 1996 now U.S. Pat. No. 5,875,875. This parent application is hereby incorporated by reference in its entirety.

TECHNICAL FIELD

This invention relates to apparatus and methods for isolating and absorbing energy associated with one or more shock forces that are exerted upon an object, such as energy attendant to shock forces experienced during and immediately following a mild to severe impact.

BACKGROUND ART

The need to provide devices to absorb energy associated with shock and impact forces has long been recognized within various industries. For example, automobiles are routinely provided with hydraulic or pneumatic suspension and/or bumper shock absorbing devices.

Other industries, however, have been resistant to using shock and impact absorbing devices, or there are no such devices that can accommodate the needs of such industries. For example, heretofore, it was nearly impossible to provide a shock absorbing device large enough to prevent an inadvertent collision between a commercial ferry or ocean liner and a dock.

Vehicles, vessels, buildings and machinery are frequently subjected to both large and small shock and impact forces. Such forces may come by way of: vehicle braking, a collision with another object; a natural disaster such as an earthquake, hurricane or tornado; and/or repetitive stressing of its structure through vibration that may cause structural fatigue. Such forces not only cause significant amounts of property damage, but can also cause physical injury and even fatality of the occupants of the object and other nearby persons.

The shock absorbers that are currently used primarily include complex hydraulic or pneumatic devices. The cost to manufacture such complex hydraulic cylinders and systems is exorbitant. Each hydraulic cylinder has a plurality of finely machined parts that must be manufactured, assembled, and maintained. Due to the many complex, metal, machined parts therein, such hydraulic cylinders are relatively heavy. Furthermore, due to misalignment, improper installation, inadequate maintenance, corrosion and unexpected angles of applied shock forces, such hydraulic cylinders do not necessarily function as initially intended. Hydraulic and pneumatic devices are also easily susceptible to adverse conditions, rupture and leakage.

In essence, the functionality and effectiveness of such hydraulic and pneumatic cylinder impact shock absorbers are at best in serious question, and at worst can be completely defective.

Furthermore, such complex hydraulic and pneumatic systems are incapable of providing and/or controlling different energy absorption rates throughout a stroke of an impact event.

The following patents illustrate several different devices that other inventors have contrived in an effort to prevent injury and damage associated with shock and impact forces: Peterson (U.S. Pat. No. 2,997,325; issued Aug. 22, 1961); Peterson (U.S. Pat. No. 3,380,557; issued Apr. 30, 1968); De Venne (U.S. Pat. No. 3,583,530; issued Jun. 8, 1971); Hall (U.S. Pat. No. 3,747,915; issued Jul. 24, 1973); Robinson (U.S. Pat. No. 3,833,093; issued Sep. 3, 1974); Casciola (U.S. Pat. No. 3,847,252; issued Nov. 12, 1974); and Gorges et al. (U.S. Pat. No. 3,968,862; issued Jul. 13, 1976).

The inventor believes that the above-listed information, apparatus and devices, whether taken alone or in combination, neither anticipate nor render obvious the present invention. The foregoing explanation does not constitute an admission that such information, apparatus or devices are relevant or material to the present claims. Rather, such information, apparatus and devices relate only to the general field of the current disclosure.

DISCLOSURE OF INVENTION

It is believed that the apparatus of the present invention will dramatically reduce, if not eliminate, injuries and deaths resulting from structural failures caused by shock and impact forces. More particularly, the present invention provides uncomplicated but very effective manufacturing methods, processes and procedures to quickly, easily and cost effectively construct, assemble, install, use, maintain, repair and replace structurally superior shock isolating and impact absorbing apparatus.

Heretofore, shock absorbers incorporated numerous complex and expensive component parts that were necessarily manufactured with very high tolerance requirements.

Contrary to the teachings of the prior art, the present invention does not require the use of an inordinate number of component parts that must be lathed, machined, separated, cataloged, gathered, fitted, bolted together, sealed and finished in a mind-numbing particular order according to a strict and stringent, complex array of instructions to construct questionably operable hydraulic and pneumatic shock absorbers.

Instead, a relatively small number of component parts are used to construct the apparatus of the present invention. The apparatus of the present invention is simple, compact, efficient, reliable, reusable, durable and rugged. The invention is easily constructed and is inexpensive and economical to manufacture. The present invention increases the speed and simplifies the procedure to manufacture, assemble, install, use, maintain, repair and replace such simplified apparatus. The present invention is also easily used and requires minimal manipulation to manufacture, assemble, install, use, maintain, repair and replace such apparatus.

Depending upon the strengths required for a particular application, this invention can be constructed using one or more of several different manufacturing techniques, including but not limited to: laminating, layering, overlaying, spray molding, injection molding, rotational molding, vacuum molding, compression molding, extrusion molding, roll forming, expansion molding, pour molding, recess molding, shell molding, plaster molding, lost-wax casting, stamping, milling, welding, shaping, grinding, water jet machining, abrasive-jet machining (AJM), laser-beam machining (LBM), electron-beam machining (EBM), and the like, to provide a rigid and/or semi-rigid, stable and structurally sound shock and impact absorbing apparatus.

Within the preferred embodiment of this invention, simple pipes or rods having bore holes and/or slots or channels therein are used. Consequently, the teachings of the preferred embodiment of the present invention eliminate the need to purchase, install, house, operate, maintain and insure an arsenal of complex manufacturing machinery that were heretofore required to manufacture hydraulic and pneumatic shock absorbers.

It is anticipated that use of the present invention will significantly decrease the amount of capital investment, operational expenditures, supply needs, shelving space, costs, time and skill that would otherwise be required to manufacture, install, use, maintain, repair and replace shock and impact isolating and energy dissipating apparatus, as compared to the teachings, procedures and devices heretofore used. In other words, it will be less expensive and more economical to manufacture, install, use, maintain, repair and replace shock and impact isolating and dissipating devices that utilize the teachings of the present invention than was ever even remotely possible with the devices of the prior art.

The apparatus of the present invention is specifically designed to have internal stability and structural integrity when attached to any one of numerous different objects. For example, the present invention may be attached to, secured to, or formed integrally within nearly any movable object, such as a car, truck, recreational vehicle, motorcycle, bicycle, ice sled, train, boat, ship, ferry, freighter, tanker, airplane, space shuttle, lunar lander, crane, farm machinery, conveyor belts, product sorting and/or transporting equipment, fork lifts, lifts, elevators, and numerous other objects.

Furthermore, the present invention may be attached to, secured to, or formed integrally within a generally non-movable object such as a house, building, factory, silo, dock, bridge, safety barrier, barricade, or other such objects that may be subjected to settling, earthquake, vibratory, impact, or other adverse shock forces.

More particularly, the present invention can be used to manufacture a wide variety of differently designed structured shock isolating and impact absorbing apparatus to meet the particular needs of nearly all potential applications. For example, the shock absorbing resistance and placement of the invention can be easily and cost effectively adjusted as circumstances require. Besides being easily modified as needed, the apparatus of the present invention can be transferred between different applications with a minimum amount of delay, difficulty, expense and downtime.

Once the principles of construction and operation of this invention are understood, the apparatus is extremely simple to manufacture, assemble and use. Only a minimum amount of manipulation, physical dexterity, skill, knowledge and effort is required to construct, assemble and use such apparatus. This invention does not necessarily require the use of a large number of complex tools to either construct, assemble, repair or replace the apparatus. In many instances, a crescent or socket wrench and possibly a screwdriver are all that are needed to install the simpler embodiments of this invention.

The present invention also provides means for assuring proper and predictable absorption and dissipation of shock and impact forces or the energy associated therewith through inexpensive apparatus having extremely low maintenance requirements. Highway engineers and municipal officials no longer need to constantly worry about the condition and operation of accident barriers, guard rails, ferry docks, and other such apparatus that are within their respective responsibilities.

The structure of the present invention permits one or a small number of relatively unskilled technicians to easily install, repair and replace the apparatus without requiring the assistance of additional service operators and use of large, heavy machinery. Please note that the presence of additional service operators and large, heavy machinery within an area that has already proven to be subject to collisions or accidents would only increase the danger and potentiality of further accident and damage. This is particularly true when installing, repairing and replacing the apparatus on a busy or heavily traveled highway or freeway.

In addition to the foregoing advantages and other advantages described further below, the present invention also overcomes all of the previously mentioned the disadvantages.

To achieve these general and specific objectives, the simplest form of the apparatus for isolating and absorbing energy associated with a shock or impact force exerted upon an object generally comprises a combination of: (a) a housing, (b) at least one segment of non-liquid material, and (c) a piston.

The housing is attached to, secured to, or formed integrally with the object that is to be protected. In essence, the housing: (a) defines an enclosure within which the non-liquid material and the piston may be placed, and (b) provides resistance to the expulsion or extrusion of the non-liquid material from within such enclosure.

The segment or segments of non-liquid material are placed or contained within the enclosure.

The piston is at least partially placed or contained within the enclosure. The piston is preferably juxtaposed near to or against the non-liquid material contained within the enclosure.

The piston or the housing is provided with at least one aperture, orifice, channel or slot that is positioned, located or formed therein.

During operation of the apparatus, the shock or impact force acts upon or is applied to either the piston or to the housing. When thus acted upon, the contraction between the housing and the piston urges the non-liquid material to pass or extrude through the aperture, orifice, channel or slot in a direction which is generally transverse to the relative movement of the piston within the enclosure. The passage or extrusion of the non-liquid material through the aperture, orifice, channel or slot absorbs or dissipates at least a portion of the energy associated with the shock or impact force.

The housing and/or piston may be manufactured from metal, graphite, ceramic, fiberglass, plastic, composite, or any other material that accomplishes the purposes of this invention.

The non-liquid material should be capable of being passed or extruded through the aperture, orifice, channel or slot. The non-liquid material preferably comprises one or more segments that are manufactured from plastic, rubber, compressed fiber, extrudable metal or composite material. Alternatively, or in addition to the previously stated materials, the non-liquid material may comprise a low or high density bubble-laden foamed material.

The non-liquid material may also comprise a plurality of successive segments. Each successive segment can be positioned to have or be manufactured from a material that has a successively greater resistance to being passed or extruded through the aforementioned aperture, orifice, channel and/or slot as the shock or impact force acts upon or is applied to the piston or to the housing to cause the piston to move through or within the enclosure.

It is very important to note that the non-liquid material of the present invention is distinguished from liquids such as water, oil, hydraulic fluid, and the like.

The non-liquid material, however, does have characteristics that permit it to become malleable and/or extrudable when placed under a particular load force or pressure.

Some of the important advantages of using non-liquid materials over that of liquids include: (a) elimination of the need to provide liquid containing seals; and (b) a different load distribution throughout the material when placed under pressure.

The piston and/or the housing can be provided with a plurality of the aforementioned apertures, orifices, channels or slots that are positioned, located or formed therein. When the piston and/or housing are acted upon by the shock or impact force, the piston is capable of urging the non-liquid material to pass or extrude through one or more of such apertures, orifices, channels or slots. The passage of such non-liquid material, however, is in a direction that is generally transverse to the relative movement of the piston within the enclosure.

Within one or more embodiments of the present invention, the plurality of apertures, orifices, channels or slots are positioned, located or formed to have a generally radial orientation to a longitudinal axis and/or radial axis of the piston or of the housing.

Similarly, a plurality of such apertures, orifices, channels or slots can be positioned, located or formed in a generally spaced relationship to each other along at least a portion of a length of the piston and/or of the housing.

The plurality of apertures, orifices, channels or slots could also be positioned, located or formed in a generally spiral or helical manner along at least a portion of a length of the piston and/or of the housing.

Rather than increase the resistance of the non-liquid material or decrease the ductility or malleability of the non-liquid material as the piston passes further into the enclosure, one or more apertures, orifices, channels and/or slots may be positioned, located, formed and/or sized to impart a successively greater resistance to the non-liquid material that is passed or extruded therethrough as the piston passes through the enclosure. For example, the above-reference plurality of apertures may be successively smaller as the piston progresses toward the end of its movement or stroke within the enclosure. This design or structure will thereby increase the resistance of the non-liquid material to pass through such apertures without having to change or alter the density or composition of the non-liquid material contained within the enclosure.

Within the preferred embodiment of the invention, the housing generally comprises an elongated pipe or conduit which defines an elongated enclosure. The housing has at least one sidewall. The housing has a first end and an opposed second end.

The first end of the housing is generally closed. For example, the first end may be closed by the enclosure not passing all the way through an otherwise solid bar. Alternatively, the first end may be closed by simply passing a plug, pin, nail, key, bolt, rod, or the like through the enclosure thereby preventing passage of the non-liquid material therepast.

The second end of the housing is generally open.

The non-liquid material is generally inserted into the enclosure through the open second end of the housing.

The piston is capable of being at least partially inserted into the enclosure through the second end of the housing. More particularly, the piston generally comprises an elongated rod, pipe or conduit that has a first end and an opposed second end. The first end of the piston is at least partially inserted through the open second end of the housing. The piston, and, more particularly, the first end of the piston, is juxtaposed near to or against the non-liquid material that is contained within the enclosure.

The cross-sectional shape of the first end and/or at least a portion of the length of the piston can be: triangular; circular; oval; elliptical; parabolic; a polygon; an annulus; and/or a quadrilateral, such as a square, rectangle, parallelogram, rhombus, trapezoid, general quadrilateral, cyclic quadrilateral, or may assume any other desired shape.

Furthermore, the first end and/or at least a portion of the length of the piston may comprise a complex combination of shapes and/or sizes, such as a column having one or more grooves, channels and/or flutes therein, and/or a piston having a stepped first end with cross-sections of gradually reducing diameters or sizes.

The first end and/or at least a portion of the length of the piston may also be provided with a ramp-like, inclined, front, forward or leading point, edge or face. The first end of the piston may also be pointed, serrated, rounded in either a convex or concave manner, or have a generally serpentine shape.

During use, the second end of the piston or the first end of the housing receives the shock or impact force. Such shock or impact force transmits its associated energy through the piston and housing into the enclosure. The first end of the piston and first end of the housing urges the non-liquid material to pass or extrude through one or more apertures, orifices, channels or slots.

The apertures, orifices, channels or slots are preferably positioned, located or formed within the sidewall of the housing.

Alternatively, the apertures, orifices, channels or slots can be positioned, located or formed within a sidewall of the piston.

The description above infers that the piston is an element separate and apart from the housing. This is generally the case. However, within an alternative embodiment of the present invention, the piston may be attached to, secured to, or formed integrally within the housing. For example, the piston and housing may be formed together by an injection molding process. During operation of the apparatus, the piston is ruptured from its integral connection with the housing to operate as explained herein.

The present invention also includes a method for isolating and absorbing energy associated with a shock or impact force that is exerted upon an object. The method of the present invention generally comprises the steps of:

(a) attaching, securing or integrally forming a housing to an object, the housing defining an enclosure;

(b) placing or inserting at least one segment of non-liquid material within the enclosure; and (c) placing or inserting a piston at least partially within the enclosure, the piston being juxtaposed near to or against the non-liquid material, the piston or the housing having at least one aperture, orifice, channel or slot positioned, located or formed therein, the piston or housing capable of urging the non-liquid material to pass or extrude through the aperture, orifice, channel or slot in a direction generally transverse to relative movement of the piston within the enclosure when the shock or impact force acts upon or is applied to the piston or to the housing, passage or extrusion of the non-liquid material through the aperture, orifice, channel or slot absorbing or dissipating at least a portion of the energy associated with the shock or impact force.

Each of the aforementioned structures and elements will be described in greater detail further below. The preferred and several different alternative embodiments of the apparatus and associated structures of the present invention and the processes for manufacture and use thereof are also further described in greater detail in the following description, claims and drawings of this Specification. However, to avoid any possible confusion as to the scope of the present invention, each of the following sections, claim language, and drawings of this Specification in their entirety are incorporated herein by this reference.

The foregoing and other objectives and advantages of the present invention will become more readily apparent upon reading the following disclosure and referring to the attached drawings.

BRIEF DESCRIPTION OF DRAWINGS

FIG. 1 is a schematic, cross-sectional, side-elevational view taken along a centerline of a prior art device generally taught in De Venne ('530).

FIG. 1A is a graphical representation of an assumed plastic pressure verses station location for the De Venne ('530) device.

FIG. 2 is a schematic, cross-sectional, side-elevational view of the De Venne ('530) device illustrated in FIG. 1, illustrating the device further into the application of the applied force.

FIG. 2A is a graphical representation of a more realistic plastic pressure verses station location for the device taught in De Venne ('530).

FIG. 3 is a schematic, partial cross-sectional, side-elevational view of a prior art device generally taught in Peterson ('325), Peterson ('557) and Hall ('915).

FIG. 3A is a graphical representation of a realistic plastic pressure verses station location for the device taught in Peterson ('325), Peterson ('557) and Hall ('915).

FIG. 3B is an aft or rear side-elevational view of the device taught in Peterson ('325), Peterson ('557) and Hall ('915) as seen from a view taken along line III—III in FIG. 3.

FIG. 4 is a schematic, partial cross-sectional, side-elevational view of a first embodiment of a shock isolator and absorber apparatus made in accordance with the teachings of the present invention.

FIG. 4A is a graphical representation of a desired plastic pressure verses station location for an apparatus of the present invention, as shown in FIG. 4.

FIG. 4B is a schematic, cross-sectional, aft or rear side-elevational view of the apparatus of the present invention as seen from a view taken along line IV—IV in FIG. 4.

FIG. 5 is an exploded, isometric view of a second embodiment of a shock isolator and absorber apparatus made in accordance with the teachings of the present invention.

FIG. 5A is a schematic, cross-sectional, side-elevational view taken along a centerline V—V in FIG. 5.

FIG. 6 is a cross-sectional, side-elevational view taken along a centerline of a third embodiment of the present invention.

FIG. 6A is a partial, cross-sectional, side-elevational view taken along a centerline of a fourth embodiment of the present invention.

FIG. 7 is a cross-sectional, side-elevational view taken along a centerline of a fifth embodiment of the present invention.

FIG. 8 is a cross-sectional, side-elevational view taken along a centerline of a sixth embodiment of the present invention.

FIG. 9 is an exploded, isometric view of a seventh embodiment of the present invention.

FIG. 10 is an enlarged, cross-sectional, plan view of the seventh embodiment taken along a centerline IX—IX in FIG. 9.

FIG. 11 is an exploded, isometric view of the seventh embodiment of the apparatus of the present invention as shown in FIGS. 9 and 10.

FIG. 12 is a cross-sectional, side-elevational view taken along a centerline of an eighth embodiment of the present invention.

FIG. 12A is an exploded, isometric view of the eighth embodiment of the invention as shown in FIG. 12.

FIG. 13 is a cross-sectional, side-elevational view taken along a centerline of a ninth embodiment of the present invention.

FIGS. 14, 14A and 14B include a series of three successive schematic, cross-sectional, elevational views of the ninth embodiment of the present invention as successively seen from a view taken along line XIV—XIV in FIG. 13.

FIG. 15 is an isometric view of a tenth embodiment of the present invention.

FIG. 15A is a plan view of the tenth embodiment of the invention as shown in FIG. 15.

FIG. 15B is an exploded, cross-sectional, elevational view of the tenth embodiment of the invention as seen from a view taken along line XV—XV in FIGS. 15 and 15A.

FIG. 16 is an isometric view of an eleventh embodiment of the present invention.

FIG. 16A is a plan view of the eleventh embodiment of the invention as shown in FIG. 16.

FIG. 16B is an exploded, cross-sectional, elevational view of the eleventh embodiment of the invention as seen from a view taken along line XVI—XVI in FIGS. 16 and 16A.

FIG. 17 is an isometric view of a twelfth embodiment of the present invention.

FIG. 17A is a plan view of the twelfth embodiment of the invention as shown in FIG. 17.

FIG. 17B is an exploded, cross-sectional, elevational view of the twelfth embodiment of the invention as seen from a view taken along line XVII—XVII in FIGS. 17 and 17A.

FIG. 18 is an isometric view of a thirteenth embodiment of the present invention.

FIG. 18A is a plan view of the thirteenth embodiment of the invention as shown in FIG. 18.

FIG. 18B is an exploded, cross-sectional, elevational view of the thirteenth embodiment of the invention as seen from a view taken along line XVIII—XVIII in FIGS. 18 and 18A.

FIG. 19 is an isometric view of a fourteenth embodiment of the present invention.

FIG. 19A is a plan view of the fourteenth embodiment of the invention as shown in FIG. 19.

FIG. 19B is an exploded, cross-sectional, elevational view of the fourteenth embodiment of the invention as seen from a view taken along line XIX—XIX in FIGS. 19 and 19A.

FIG. 20 is an isometric view of a fifteenth embodiment of the present invention.

FIG. 20A is a plan view of the fifteenth embodiment of the invention as shown in FIG. 20.

FIG. 20B is an exploded, cross-sectional, elevational view of the fifteenth embodiment of the invention as seen from a view taken along line XX—XX in FIGS. 20 and 20A.

FIG. 21 is an isometric view of a sixteenth embodiment of the present invention.

FIG. 21A is a plan view of the sixteenth embodiment of the invention as shown in FIG. 21.

FIG. 21B is an exploded, cross-sectional, elevational view of the sixteenth embodiment of the invention as seen from a view taken along line XXI—XXI in FIGS. 21 and 21A.

FIG. 22 is an isometric view of a seventeenth embodiment of the present invention.

FIG. 22A is a plan view of the seventeenth embodiment of the invention as shown in FIG. 22.

FIG. 22B is an exploded, cross-sectional, elevational view of the seventeenth embodiment of the invention as seen from a view taken along line XXII—XXII in FIGS. 22 and 22A.

FIG. 23 is a partial, cross-sectional, side-elevational view taken along a centerline of an eighteenth embodiment of the present invention.

FIG. 24 is a partial, cross-sectional, side-elevational view taken along a centerline of a nineteenth embodiment of the present invention.

FIG. 25 is a partial, cross-sectional, side-elevational view taken along a centerline of a twentieth embodiment of the present invention.

FIG. 26 is a partial, cross-sectional, side-elevational view taken along a centerline of a twenty-first embodiment of the present invention.

FIG. 27 is a partial, cross-sectional, side-elevational view taken along a centerline of a twenty-second embodiment of the present invention.

FIG. 28 is a partial, cross-sectional, side-elevational view taken along a centerline of a twenty-third embodiment of the present invention.

FIG. 29 is a partial, cross-sectional, side-elevational view taken along a centerline of a twenty-fourth embodiment of the present invention.

FIG. 30 is a partial, cross-sectional, side-elevational view taken along a centerline of a twenty-fifth embodiment of the present invention.

FIG. 31 is a partial, cross-sectional, side-elevational view taken along a centerline of a twenty-sixth embodiment of the present invention.

FIG. 32 is a partial, cross-sectional, side-elevational view taken along a centerline of a twenty-seventh embodiment of the present invention.

FIG. 33 is a partial, side-elevational view of a twenty-eighth embodiment of the present invention.

FIG. 34 is an exploded, cross-sectional, end-elevational view of the twenty-eighth embodiment of the invention as seen from a view taken along line XXXIV—XXXIV in FIG. 33.

FIG. 35 is a partial, side-elevational view of the twenty-eighth embodiment of this invention with the additional use of a netted membrane wrapped thereabout.

FIG. 36 is a partial, cross-sectional, side-elevational view taken along a centerline of a twenty-ninth embodiment of the present invention.

FIG. 37 is a partial, cross-sectional, side-elevational view taken along a centerline of a thirtieth embodiment of the present invention.

FIGS. 38–39 are exploded perspective and partial perspective views, respectively, of an embodiment of this invention that uses an arcuate piston stroke.

FIG. 40 is a schematic sectional view of an embodiment of this invention that operates in tension.

FIGS. 41, 42 and 43 are three perspective views of another embodiment of this invention that operates in tension.

FIGS. 44 and 45 are exploded and side views, respectively, of an embodiment of this invention that uses a flexible housing that operates in tension.

FIGS. 46–50 are schematic longitudinal-sectional, end, and cross-sectional views, respectively, of another embodiment of this invention that includes a ported piston.

FIGS. 51–53 are longitudinal-sectional, cross-sectional, and longitudinal-sectional views, respectively, of another embodiment of this invention that uses a piston having an off-centered tapered port therein.

One should understand that the drawings are not necessarily to scale and the elements are sometimes illustrated by graphic symbols, phantom lines, diagrammatic representations and fragmentary views. In certain instances, the inventor may have omitted details which are not necessary for an understanding of the present invention or which render other details difficult to perceive.

BEST MODE FOR CARRYING OUT THE INVENTION

Referring to the attached drawings, wherein like numerals indicate like parts, FIG. 1 illustrates a prior art device 20 as generally taught in De Venne ('530). FIG. 1 illustrates the De Venne ('530) device 20 is in a condition prior to an application of an external impact force. The De Venne ('530) device 20 generally comprises a housing 22, which defines an enclosure 24, a piston 26, and elastically yieldable material 28.

As shown in FIG. 1A, please note that the teachings of De Venne ('530) assume that the plastic pressure will gradually increase as the piston 26 is urged further into the enclosure 24. Such an assumption, however, is incorrect.

FIG. 2 illustrates the De Venne ('530) device 20 further into the application of the applied impact force. Please note that contrary to the teachings of De Venne ('530), the elastically yieldable material 28 will begin to gather or dam near a forward end 30 of a biconical portion or block of the piston 26. Consequently, the De Venne ('530) device 20 will jam and/or become inoperative very soon after the force is applied thereto.

For the teachings of De Venne ('530) to operate, the yield point or compressive strength of the elastically yieldable material 28 must be greater that the pressures needed to extrude the elastically yieldable material 28 past the piston 26. In other words, the ejection pressure of the elastically yieldable material 28 must be significantly lower than the compressive strength of the elastically yieldable material 28. Such a condition does not exist in the real world. Consequently, the behavior predicted in De Venne ('530) will not occur.

As seen in FIG. 2A, a more realistic representation of the plastic pressure verses station location for the De Venne ('530) device illustrates that the plastic pressure will remain nearly constant until the elastically yieldable material 28 begins to dam near the forward end 30 of the piston 26. For example, a relatively constant yield point may be between 3,000 and 5,000 pounds per square inch (psi). However, once damming or jamming occurs, the plastic pressure necessary to impart further movement to the piston 26 within the enclosure 24 increases very dramatically to between 20,000 and 30,000 psi. Effectively, the piston 26 becomes jammed within the enclosure 24.

It is firmly believed that jamming of the elastically yieldable material 28 within the housing 22 will occur within most all of the devices taught within the above-referenced patents. Jamming of such elastically yieldable material 28 within the housing 22 will effectively render such devices 20 of the prior art inoperative for their intended purpose.

FIG. 3 illustrates a prior art device 20' as generally taught in Peterson ('325), Peterson ('557) and Hall ('915) (hereinafter referred to as the Peterson ('325) device). FIG. 3 illustrates the Peterson ('325) device 20' is in a condition prior to an application of an external impact force. The Peterson ('325) device 20' generally comprises a housing 22', which defines an enclosure 24', a piston 26', and elastically yieldable material 28'. Housing 22' also has an ejection port 32' at a terminal end of the housing 22' which is positioned in a collinear manner relative to movement of the piston 26' within enclosure 24'. The intended action of the Peterson ('325) device 20' is to extrude the elastically yieldable material 28' through the ejection port 32' when a force is applied to the piston 26'.

As seen in FIG. 3A, a realistic representation of the plastic pressure verses station location for the Peterson ('325) device illustrates that again jamming will occur. The required plastic pressure to cause ejection of the elastically yieldable material 28' through the ejection port 32' will be extremely high for any movement of the piston 26' to even occur. More particularly, the plastic pressure at the ejection port 32' is very low, and significantly below ejection pressures, during at least the initial phase of the piston 26' movement. It is firmly believed that aft porting of the elastically yieldable material 28' through the ejection port 32' will simply not occur.

When compared to the De Venne ('530) device 20, the Peterson ('325) device 20' is already dammed near a forward end 30' of the piston 26'. Consequently, the piston 26' cannot even move through a partial stroke before the pressure forces at the forward end 30' jam the elastically yieldable material 28' within the enclosure 24'.

The only way that the Peterson ('325) device 20' will work is if the material 28' consists of a liquid which transmits the applied force equally throughout the entire liquid medium. Under such circumstances the liquid could be expelled from the aft ejection port 32'.

As seen in FIG. 4, the present invention generally comprises new apparatus 34 and methods for absorbing energy attendant to resisting the application of small and large shock and impact forces. Apparatus 34 can be used within a wide variety of different applications and environments. For example, apparatus 34 could be used to absorb and dissipate impact energy attendant to a vehicular collision, impact with a collision barrier, jolting and/or movement of a building and/or bridge during an earthquake, shock impacts experienced when turning on and off various machinery, and similar situations.

The present invention is extremely simple, has very few parts, and requires very little effort or expense to manufacture, install, use, maintain, repair and replace. Consequently, the present invention can be manufactured and used at a very low cost. The present invention is also extremely effective in absorbing and dissipating energy associated with impact forces, and effectively isolates shock forces from the support structure or object to which the apparatus 34 is attached and intended to protect.

The apparatus 34 of the present invention generally comprises a housing 36, which defines an enclosure 38, a piston 40 or ram rod, and one or more segments of an elastically yieldable material or non-liquid filler material 42. Several very important distinctions, however, exist between the present invention and the teachings of the prior art.

Within the present invention, the housing 36 and/or the piston 40 are provided with at least one aperture, orifice, channel or slot 44 that is positioned, located or formed therein. During operation of the apparatus 34, when the shock or impact force acts upon or is applied to either the piston 40 or to the housing 36, the piston 40 urges the non-liquid material 42 to pass or extrude through the aperture, orifice, channel or slot 44 in a direction that is generally transverse to the relative movement of the piston 40 within the enclosure 38. This is a very important distinction over the teachings of the prior art.

Please note that the non-liquid material 42 is expelled from one or more holes, apertures, orifices, channels and/or slots 44 in a direction that is generally transverse or perpendicular to the direction of the applied shock or impact force, and/or to the relative movement of the piston 40 within the enclosure 38. Thus structured, the teachings of the present invention are in stark contrast to the teachings of the above-referenced patents. More particularly, the present invention teaches within many of its embodiments that successive or progressive apertures 44 should be located along the length of the housing 36. Such successive or progressive apertures 44 are primarily engaged after the applied force has expelled a predetermined amount of preceding non-liquid material 42 from the enclosure 38. This structural feature effectively prevents jamming of the non-fluid material 42 within the housing 36.

It is the passage or extrusion of the non-liquid material 42 through the aperture, orifice, channel or slot 44 that absorbs or dissipates at least a portion of the energy associated with the shock or impact force. In other words, within the present invention, the energy associated with the shock and impact forces is absorbed and dissipated by causing the piston 40 to move through the enclosure 38 contained within the housing 36 and force the non-liquid material 42 contained within the enclosure 38 to pass or extrude through one or more apertures, orifices, channels or slots 44 positioned, located or formed within and/or adjacent to the housing 36. More particularly, the piston 40 urges the non-liquid material 42 to pass or extrude through one or more apertures, orifices, channels or slots 44 in a direction that is generally transverse to the relative movement of the piston 40 within the enclosure 38.

The apertures, orifices, channels or slots 44 through which the non-liquid material 42 is passed or extruded can be present in a sidewall of the piston 40 or within a sidewall of the housing 36.

As seen in FIG. 4B, aperture, orifice, channel or slot 44 may more particularly comprise one or more ejection apertures or orifices 44' and/or one or more channels or slots 44". Within the apparatus 34 illustrated in FIGS. 4 and 4B, channel or slot 44" is continuous along a longitudinal length of the housing 36.

Referring to FIG. 4A, it is the intention of the inventor to provide an apparatus 34 with one or more apertures, orifices, channels or slots 44 that are positioned in a zone exposed to higher plastic pressures, such as those which occur near the face of the piston 40. Consequently, the non-liquid materials 42 adjacent or near to the piston 40 can be extruded through such apertures, orifices, channels or slots 44. As the piston 40 moves throughout its full stroke, the plastic pressure applied to the piston 40 in order to eject the non-liquid material 42 will remain relatively constant. The dotted line within FIG. 4A represents the needed extrusion pressure as the piston 40 passes throughout its stroke. In essence the curve shown in FIG. 3A moves to the right as the piston 40 also moves to the right throughout its stroke to form the dotted line.

Although this ideal situation will be difficult to accomplish, the apparatus 20 of the present invention as taught herein provides numerous different variables that can be adjusted to generally accomplish these purposes. For example, as will be discussed further below, the placement, size and configuration of the apertures, orifices, channels or slots 44 can be modified as needed. Similarly, a plurality of different segments of non-liquid material 42 can be used within the enclosure 38 to generally achieve these goals.

The housing 36 and piston 40 may be manufactured from any desirable metal, graphite, ceramic, fiberglass, plastic or composite material.

The segment or segments of the elastically yieldable material or non-liquid filler material 42 may be manufactured from any desirable plastic, rubber, compressed fiber, extrudable metal or composite material. For example, the non-liquid material 42 may be manufactured from a plastic material such as polyethylene or polypropolene. In other words the enclosure 38 is at least partially filled with a relatively stiff and/or very stiff polyethylene or polypropolene non-liquid plastic material. Other potential materials for the extrudable non-liquid material 42 may include, but are not limited to: phenol-formaldehyde (with or without wood, flour, mineral macerated-fabric and/or sisal-felt filler, and/or cotton-fabric, glass-fabric and/or asbestos-cloth laminate); birch plywood having a phenolic binder; urea-formaldehyde having an alpha-cellulose filler and/or cotton-fabric laminate; melamine-formaldehyde having an alpha-cellulose filler and/or asbestos filler; aniline-formaldehyde; casein-formaldehyde; phenol-furfural having a wood-flour, mineral and/or fabric filler, and/or laminate; Columbia allyl resin 39 having a paper, fabric and/or glass-loth laminate; shellac; rubber-sulphur; ceramic "prestite" of flint feldspar, ball clay and/or china clay; cellulose acetate; cellulose nitrate or celluloid; cellulose acetate butyrate; ethyl cellulose; methyl methacrylate; nylon; vinyl chloride; vinylidene chloride; polystyrene or vinyl benzene; and/or soluplastics having vulcanized fibers.

Furthermore, a plurality of different segments of non-liquid material 42 can be employed that provide progressively increased resistance to extrusion or movement of the piston 40. In other words, the apparatus 34 may be modified by utilizing a non-liquid material 42 made from a plurality of differently layered segments of plastic, rubber and/or compressed composite material that have different degrees of density, fluidity and/or viscosity under shock or impact load pressure.

If the enclosure 38 is filled with varying types of non-liquid materials 42, each type may have a different or varying load carrying or ejection pressure capability. If different non-liquid materials 42 are used, then materials that will deform and/or extrude under lighter loads should be placed to initially extrude through the apertures, orifices, channels or slots 44. Consequently, lighter shock loads can be easily absorbed, allowing displacement of the more viscus non-liquid materials 42 when placed under pressure.

However, as the shock loads increase in intensity and/or duration, the piston 40 may enter a high load zone of the non-liquid materials 42. The more dense and less malleable non-liquid materials 42 will absorb higher or greater amounts of shock loads before being extruded or expelled through the apertures, orifices, channels or slots 44.

As discussed above, the non-liquid material 42 could be manufactured from a composite material 42. For example, conductive metal fibers or other heat conductive materials could also be added to the non-liquid material 42. Use of conductive metal fibers or other heat conductive materials within the non-liquid material 42 will help dissipate a build-up of waste heat that might be generated by long duration work loads.

If no voids are present within the enclosure 38, the movement of the piston 40 through the enclosure 38 will cause the non-liquid material 42 to be forced through the apertures, orifices, channels and/or slots 44.

Since the compression strength of the non-liquid material 42 can be predetermined with relatively precise accuracy, the behavior of the non-liquid material 42 contained within the enclosure 38 can also be anticipated or projected with similar accuracy. Consequently, the behavior of the piston 40 and non-liquid material 42 will be relatively predictable and the apparatus 34 can be designed to meet the needs of nearly any desired application or situation.

Alternatively, or in addition thereto, the apertures, orifices, channels and/or slots 44 can be presented in an array whereby progressively increased resistance to passage or extrusion occurs in response to greater impact forces. For example, the apertures, orifices, channels and/or slots 44 can be designed and arrayed to progressively decrease in size, number and/or shape to provide progressively increasing resistance to extrusion in response to experiencing continued or greater impact forces.

In other words, the apparatus 34 of the present invention can be easily modified to absorb different amounts of impact force energy by varying the size and/or position of the extrusion or expulsion holes, apertures, orifices, channels and/or slots 44. For example, the holes, apertures, and/or orifices 44' can be placed in a spaced non-linear, spiral or helical manner along the length of a cylindrically-shaped housing 36. The size of the holes, apertures and/or orifices 44' can also be modified to progressively decrease in diameter nearer to a closed end of the housing 36, thereby successively increasing the resistance of the non-liquid material 42 by decreasing the extrusion port sizing or flow area.

FIG. 5 illustrates a second embodiment of the present invention. FIG. 5A further illustrates the second embodiment of this invention in a condition prior to and during the application of a impact or shock force.

Within the second embodiment of this invention, the shock isolator apparatus 34 comprises housing 36 which is defined by a cylinder of metal pipe 36' having threads 46 at each respective end thereof. For example, the housing 36 or cylinder may comprise a standard one-half (½) inch diameter conventional plumbing pipe 36'. A first terminal end 48 of housing 36 is inserted and threaded into a receiving cap 50 which effectively seals the first terminal end 48. A cap 52 is similarly secured and threaded to a second open end 54 of housing 36. The cap 52 has an opening 56 therein through which the piston 40 may pass.

Within the second embodiment of this invention, the piston 40 has a first or leading end or face 58 having a generally centrally located protruding member 60 which is insertable into the non-liquid material 42.

The housing 36 is provided with a plurality or series of small holes, apertures and/or orifices 44' drilled along a portion of its length. Each hole, aperture and/or orifice 44' preferably has a diameter of approximately three-sixteenths (3/16) of an inch. The holes, apertures and/or orifices 44' are preferably placed in a spaced linear manner along the length of the housing 36.

During installation, the receiving cap 50 is secured to the first terminal end 48 of the housing. A plug of non-liquid material 42 is placed into the enclosure 38. The first or leading end or face 58 of piston 40 is inserted into the enclosure 38 and is urged or juxtaposed against or near to the plug of non-liquid material 42. Then the cap 52 is placed over the piston 40 and is secured to the second open end 54 of housing 36.

During operation of the apparatus 34, portions or segments of the non-liquid material 42, that were previously contained within the enclosure 38 of the housing 36, are urged by the movable piston 40 to pass or extrude through one or more of the holes, apertures or orifices 44' located along the length of the housing 36. The non-liquid material 42 passes or extrudes through the holes, apertures and/or orifices 44' in a direction that is generally transverse to the relative movement of the piston 40 within the enclosure 38.

Please note within FIG. 5A that a greater length or amount of the non-liquid material 42 is expelled as portions or segments 62 closer to the second open end 54 of housing 36 and the first or leading end or face 58 of the piston 40. The expulsion rate of the non-liquid material 42 is reduced, however, in a direction further down into the non-liquid material 42 approaching the first terminal end 48 of the housing 36. This characteristic or action of the non-liquid material 42 documents that the greater forces are exerted upon those portions of the non-liquid material 42 immediately adjacent to the first or leading end or face 58 of the piston 40. Similarly, significantly lesser forces are exerted upon those portions of the non-liquid material 42 adjacent to the first terminal end 48 of the housing 36.

Informal testing of the second embodiment of this invention has revealed that the foregoing described apparatus 34 is capable of absorbing a force of up to 12 tons. Such force urges the plastic non-liquid material 42 contained within the enclosure 38 to extrude through the holes, apertures or orifices 44'. When tested to failure, the housing 36 or steel cylinder used within the experiment eventually ruptured open between two adjacent extrusion or expulsion holes, apertures or orifices 44'.

FIG. 6 illustrates a third embodiment of the apparatus 34 of the present invention. Within the third embodiment, the piston 40 is provided with one or more holes, apertures and/or orifices 44' therein through which the non-liquid material 42 may pass or be extruded. Please note that the first or leading end or face 58 of the piston 40 is provided with means for capturing the non-liquid material 42 and directing it into an auxiliary enclosure 64 located within the piston 40. Once the non-liquid material 42 is thus captured, portions thereof are extruded out of one or more holes, apertures and/or orifices 44' positioned within the piston 40.

FIG. 6 illustrates how the apparatus 34 of the present invention can be secured to a bumper 66 on a vehicle or to a barricade barrier 68.

FIG. 6 further illustrates how the apparatus 34 can be amounted by means of a mounting bracket 70 to any desired structure.

FIG. 6A illustrates a fourth embodiment of the present invention, wherein the first or leading end or face 58 of the piston 40 is juxtaposed against the non-liquid material 42, similar to that shown in FIG. 6. However, the first or leading end or face 58 of the piston 40 which initially contacts the non-liquid material 42 is not sharpened and has a greater surface area than the embodiment illustrated in FIG. 6. The advantage of this illustrated design is that a greater volume of plastic must be displaced and moved at the leading edge, tip or face 58 of the piston 40, thereby, requiring the apparatus 34 to perform a greater amount of work at that location. Consequently, a greater amount of resistance is imparted by this embodiment of the invention than that shown in FIG. 6.

Heat created at the leading edge or tip of the piston 40 during operation of the apparatus 34 will be at least partially dissipated into the piston 40 and non-liquid material 42.

Furthermore, thus shaped, the first or leading end or face 58 of the piston 40 urges the non-liquid material away from becoming jammed between outer sidewalls of the piston 40 and the inner sidewalls of the housing 36.

Alternatively, under some circumstances, it may be desirable to have such increased frictional blockage of the non-liquid material 42 between the interior sidewalls of the housing 36 and the exterior or outer sidewalls of the piston 40. Under such circumstances, the front, leading edge or face 58 of the piston 40 may be pointed, rounded, flat, or assume any other shape to accomplish such a purpose.

FIG. 6A also illustrates the passage of the non-liquid material 42 into a centrally located cavity or auxiliary enclosure 64 of the piston 40.

If the apertures are positioned within the sidewalls of the piston 40, a more turbulent displacement of the non-liquid material 42 will be created. For example, there would be a greater degree of degradation caused to the non-liquid material 42, i.e., seams, breakage, mixing, and the like would occur within the non-liquid material 42, as compared to simple passage or extrusion of the non-liquid material 42 outwardly from an aperture 44' positioned within the sidewall of the housing 36. In other words, the non-liquid material 42 would be retained within the apparatus 34 and would be subjected to additional compressive forces when urged against or upon itself when forced into the auxiliary interior cavity or enclosure 64 within a central area of the piston 40.

FIG. 7 illustrates a fifth embodiment of the present invention, wherein the apparatus 34 generally comprises a telescopically collapsing structure. More particularly, the housing 36 comprises a plurality of colinearly oriented housing elements 76, 78 and 80. Housing elements 76, 78 and 80 can be urged to collapse or compress in a telescopic manner into an enclosure 38 of each successively engaged housing element, namely enclosures 82, 84 and 86, respectively. Thus constructed, the apparatus 34 eliminates any adverse impact that the housing 36 could have on the apparatus 34 when the piston 40 contacts and is urged against the housing elements 76, 78 and/or 80. A screw, pin, nail, or any other appropriate securing means 88 may be used to secure the housing elements 76, 78 and 80 to each other. When telescopically compressed, the preceding housing element 76 or 78 joins with the piston 40 to form a combined, composite piston for successive housing elements 78 or 80.

FIG. 8 illustrates a sixth embodiment of the present invention, wherein the housing 36 comprising two colinearly oriented housing elements 90 and 92. Housing element 90 effectively encompasses or encloses housing element 92. A generally cylindrical and/or tubular segment of the non-liquid material 42 is juxtaposed between the outer housing element 90 and the inner housing element 92. The inner housing element 92 has at least one aperture, orifice, channel or slot 44 positioned, located or formed therein through which the non-liquid material 42 may pass or be extruded.

The sixth embodiment of this invention prevents extruded segments 62 of the non-liquid material 42 from being expelled outwardly from the apparatus 34. Instead, all extruded segments 62 of the non-liquid material 42 are contained within a hollow second enclosure 38" formed by or within the inner housing element 92.

In other words, the sixth embodiment shown in FIG. 8 generally comprises a structure wherein instead of the non-liquid material 42 being extruded or expelled outwardly, a series of concentric housing conduits are used. The aforementioned apertures 44 are placed within the interior housing 92 or conduit. When the non-liquid material 42 passes through the apertures 44, such non-liquid material is directed toward a centrally located receiving enclosure 93 of the innermost interior housing 92.

FIGS. 9, 10 and 11 illustrate a seventh embodiment of the present invention, wherein the housing 36 has two colinearly oriented housing elements 90 and 92, similar to that shown in FIG. 8. Housing element 90 effectively encompasses or encloses housing element 92. Housing element 92, however, is not hollow, but rather comprises a centrally located solid bar. A plurality of generally cylindrical and/or tubular segments 94, 96 and 98 of the non-liquid material 42 are juxtaposed between the outer housing element 90 and the inner housing element 92. Each successive segment 94, 96 and 98 has a successively greater resistance to being passed or extruded through the elongated aperture, orifice, channel or slot 44" relative to movement of the piston 40 within the enclosure 38.

The inventor prefers to use non-liquid materials of differing colors for each category of resistance capacity. The different colors of the successive segments 94, 96 and 98 of non-liquid materials can be used to diagnose or determine the respective loads or impact forces to which the apparatus 34 was subjected. This information can also be used to determine the relative speed and rate of impact between the apparatus 34 and impacting object. Such information may be pivotal to determine liability in automobile collisions and the like.

As illustrated in FIGS. 9, 10 and 11, the outer housing element 90 of the seventh embodiment also has at least one aperture, orifice, channel or slot 44 positioned, located or formed therein through which the non-liquid material 42 may pass or be extruded. More particularly, outer housing element 90 has an elongated channel or slot 44" through which each successive segment 94, 96 and 98 of the non-liquid material can be extruded or passed.

When only a single elongated channel or slot 44" is used, it may be difficult to expel the non-liquid material 42 from the back or far side of the enclosure 38 which is positioned opposite from where the channel or slot 44" is found. To overcome this difficulty, as shown in FIG. 11, the first or leading end or face 58 of the piston 40 may be wedged, slanted or ramped to urge the rearward positioned non-liquid material 42 toward the channel or slot 44".

FIGS. 12 and 12A illustrate an eighth embodiment of the present invention. The eighth embodiment is very much like the first embodiment of this invention. However, there are various differences that are worthy of notation. For example, whereas the first embodiment contained both apertures and orifices 44' and a channel or slot 44", the eighth embodiment only includes a single channel or slot 44". The eight embodiment also includes the use of a plurality of non-liquid materials 42, similar to cylindrical and/or tubular segments 94, 96 and 98. However, the plurality of non-liquid materials 42 are solid plugs or rods of such material. Another distinguishing feature is that the first or leading end or face 58 of the piston 40 is partially similar to that found within the second embodiment of the invention as shown in FIGS. 5 and 5A. More particularly, the first or leading end or face 58 of the piston 40 within the eighth embodiment of the invention has a centrally located protruding member 60 with a plurality of stepped, successively larger rings, ridges, or flanges 100 positioned thereabout.

FIG. 13 illustrates a ninth embodiment of the present invention. The ninth embodiment differs from the eighth embodiment in that the leading edges 102 of cylindrical and/or tubular segments 96 and 98 are generally convex or conical in shape.

Similarly each trailing edge 104 of segments 94 and 96 are generally concave to receive the convex or conical leading edges 102 of segments 96 and 98.

In other words, FIG. 13 illustrates a generally conical, or concavo-convexo shape of successive segments 94, 96 and 98 of the non-liquid material 42. The successive segments 94, 96 and 98, having such illustrated shapes, provide a relatively gradual increase in resistance for the apparatus 34, rather than causing the piston 40 to experience an abrupt change in resistance when engaging successive segments 94, 96 and 98 of the non-liquid material 42.

FIGS. 14, 14A and 14B include a series of three enlarged, successive schematic, cross-sectional, end-elevational views of the ninth embodiment of the present invention as successively seen from a view taken along line XIV—XIV in FIG. 13. Each of these views progressively illustrates: (a) the initial position of the non-liquid material 42 before a force is applied; (b) initial passage or extrusion of a relatively ductile non-liquid material 42 through the elongated aperture, orifice, channel or slot 44; and (c) passage or extrusion of a relative stiff or less ductile non-liquid material 42 through the elongated channel or slot 44".

FIG. 14 illustrates the non-liquid material 42 at rest within the enclosure 38 of the housing 36.

Once an impact force is applied to either the piston 40 and/or to the housing 36, a portion of the non-liquid material 42 is extruded out of the apertures, orifices, channels and/or slots 44. The ejected portions or segments 62 of the non-liquid material 42 are indicated with the reference numeral 62. The initial passage or extrusion of a relatively ductile non-liquid material 42 through the elongated aperture, orifice, channel or slot 44 can also occur when a relatively slow impact loading force is applied to the apparatus.

If a channel or slot 44" is used, it is the experience of the inventor that the width of the channel or slot 44" is enlarged as a greater amount of the ejected portions or segments 62 of the non-liquid material 42 is ejected or extruded therefrom. The passage or extrusion of the relative stiff or less ductile non-liquid material 42 through the elongated channel or slot 44" usually occurs when the apparatus is exposed to a rapid impact loading force. Such enlargement is illustrated in FIG. 14B.

Please note that when a relatively stiff or less ductile non-liquid material 42 is urged through the elongated channel or slot 44", the sidewall of the housing 36 may slightly spring apart, thereby absorbing additional energy from the applied force. The enlargement is an elastic reaction of the housing 36 to the applied force, which results in the expansion of the channel or slot 44". Such enlargement of the channel or slot 44" is easily predictable and should be taken into consideration when designing the apparatus 34 to meet a particular need. The forgiving nature of the housing 36 and the springable channel or slot 44" can control the energy absorption rate of the apparatus 34 and keep it relatively constant.

The springing or enlargement of the elongated channel or slot 44" may reduce the load absorption rate of the apparatus. In other words, such enlargement of the channel or slot 44" can function to absorb impact energy attendant to the impact force.

FIGS. 15, 15A and 15B illustrate a tenth embodiment, and FIGS. 16, 16A and 16B illustrate an eleventh embodiment, of the present invention. The tenth and eleventh embodiments are very similar to the ninth embodiment of this invention. There are a few changes, however, that should be noted. For example, rather than using and external mounting bracket 70, as previously described and shown, the tenth and eleventh embodiments utilize an integral mounting means 106. Mounting means 106 may comprise one or more bolts 108, lag bolts, pins, nails, clamps, screws, or any other appropriate means for securing or attaching the housing 36 to an object. As illustrated, mounting means 106 also includes one or more boreholes 110 that are positioned within the housing 36. To prevent excessive removal of retention material within the housing 36, it is preferred that the boreholes 110 be generally aligned with the apertures, orifices, channels and/or slots 44. Aligning or positioning the boreholes 110 and bolts 108 with the apertures, orifices, channels and/or slots 44 minimizes weakening the housing 36. Please note that the heads 112 of bolts 108 should be generally flush with the inner sidewalls 74 of the housing 36.

FIGS. 16, 16A and 16B further illustrate that the channel or slot 44" need not be continuous. Rather, if desired, relatively small segments 114 of housing 36 may remain when the channel or slot 44" is created. Segments 114 function as bands or connection points to prevent or reduce the amount of expansion of the channel or slot 44" during operational loading of the apparatus 34. If needed, the segments 114 may be designed to rupture, shear or fail and thereby accommodate continued operation of the apparatus 34 along a very long distance or length of housing 36 as will be discussed further below. The thickness of the segments 114 may also be modified or reduced to impart a predictable rupturable pattern thereof. Segments 114 can also be created by welding connecting points across the channel or slot 44". The piston 40 and the non-liquid material 42 are not shown within FIGS. 15, 15A, 15B, 16, 16A or 16B.

FIGS. 17, 17A and 17B illustrate a twelfth embodiment and FIGS. 18, 18A and 18B illustrate a thirteenth embodiment of the present invention.

The tenth and twelfth embodiments of this invention are very similar to one another and have much of the same structure. However, within the twelfth embodiment, the channel or slot 44" has a stepped structure or path. More particularly, channel or slot 44" within the twelfth embodiment has a relatively narrow channel or slot 116, a slightly wider channel or slot 118, and an even wider channel or slot 120. The purpose for these progressively smaller channels or slots 120, 118 and 116, are to provide a progressively contracted and/or restrictive path through which the non-liquid material 42 is to pass or be extruded as the piston 40 progresses through its full stroke. As the channel or slot 44" becomes progressively smaller in width, the non-liquid material 42 will experience a greater amount of resistant to passage therethrough. This phenomenon will occur simply because of the greater amount of constriction in the extrusion path or passage.

FIGS. 18, 18A and 18B illustrate a thirteenth embodiment of the present invention. The thirteenth embodiment is very much like the twelfth embodiment of this invention. However, instead of having easily identifiable, distinct channels or slots 120, 118 and 116, which are progressively smaller approaching the first terminal end 48 of the housing 36, the thirteenth embodiment uses a single channel or slot 122. Channel or slot 122 is tapered from a wider width or opening located near the second open end 54 of the housing 36 to a narrower width or opening located near first terminal end 48 of the housing 36. Channel or slot 122 will generally accomplish the same purposes as channels or slots 120, 118 and 116. However, use of channel or slot 122 would impart a smoother transition throughout the full stroke of the piston 40 within the enclosure 38. The piston 40 and the non-liquid material 42 are not shown within FIGS. 17, 17A, 17B, 18, 18A or 18B.

FIGS. 19, 19A and 19B illustrate a fourteenth embodiment of the present invention. The fourteenth embodiment is very much like the eighth embodiment of this invention shown in FIG. 12. However, instead of having a single, continuous channel or slot 44", the fourteenth embodiment uses a plurality of channels or slots 124, 126 and 128 which are placed in a generally helical and/or radial pattern around at least a portion of the housing 36.

FIGS. 19, 19A and 19B also illustrate the use of two different mounting brackets 70 and 70' that can be used to secure the apparatus 34 to an object. More particularly, one or more bolts 108, screws, pins, nails, or any other appropriate securing means 88 may pass through boreholes 130 located within mounting brackets 70 and/or 70'.

FIGS. 20, 20A and 20B illustrate a fifteenth embodiment of the present invention. The fifteenth embodiment is very much like the fourteenth embodiment of this invention. However, each of the plurality of channels or slots 124', 126' and 128', which are placed in a generally helical and/or radial pattern around at least a portion of the housing 36, are tapered from a wider width or opening located nearer to the second open end 54 of the housing 36 to a narrower width or opening located nearer to the first terminal end 48 of the housing 36. Again, the piston 40 and the non-liquid material 42 are not shown within FIGS. 19, 19A, 19B, 20, 20A or 20B.

FIGS. 21, 21A and 21B illustrate a sixteenth embodiment and FIGS. 22, 22A and 22B illustrate a seventeenth embodiment of the present invention. The sixteenth and seventeenth embodiments are quite similar to the fourteenth and fifteenth embodiments of this invention discussed above. However, within the sixteenth embodiment, as shown in FIGS. 21, 21A and 21B, the apparatus 34 utilizes both a plurality of holes, apertures and/or orifices 44' and one or more channels or slots 44". It is the inventors experience that holes, apertures and orifices 44' provide a greater amount of flow restriction than the channels and/or slots 44".

The seventeenth embodiment, as shown in FIGS. 22, 22A and 22B, illustrates the use of a plurality of holes, apertures and/or orifices 44' that are placed at selected locations along a longitudinal length of the housing 36. Please note that smaller holes, apertures or orifices 132, having a relatively more dispersed pattern, are placed nearer to the first terminal end 48 of the housing 36. Slightly larger holes, apertures or orifices 134, having a closer packed placement, are placed nearer to a midpoint along the length of the housing 36. Even larger holes, apertures or orifices 136, having an even closer packed placement, are placed near to the second open end 54 of the housing 36. Again, the piston 40 and the non-liquid material 42 are not shown within FIGS. 21, 21A, 21B, 22, 22A or 22B.

FIG. 23 illustrates an eighteenth embodiment of this invention, wherein in addition to using cylindrical and/or tubular segments 94 and 96, which define slugs of non-liquid material 42, the apparatus 34 also includes one or more resilient, mechanical, compression springs 138. Spring 138 is intended to absorb small impacts and/or shock forces without deforming or extruding the non-liquid material 42, such as segments 94 and 96. However, if a greater load force is applied to the apparatus 34, the spring 138 would be compressed and non-liquid material 42 would be expelled or extruded from the housing 36 through apertures, orifices, channels and/or slots 44.

FIG. 24 illustrates a nineteenth embodiment of this invention. The nineteenth embodiment is very similar to the eighteenth embodiment of this invention. However, a slug of resilient compressible material 140, made from rubber, latex or any other resilient material, is used within the enclosure 38 instead of the spring 138. The resilient compressible material 140 may take any desired form or shape that will impart the desired operative characteristics.

FIG. 25 illustrates a twentieth embodiment of this invention, wherein a forward segment 94 of non-liquid material 42 is shaped to have a generally conically-shaped appearance. The illustrated shape will provide a smaller amount of resistance to the initial movement of the piston 40, than will be experienced after the entire first or leading end or face 58 of the piston 40 is in contact with the non-liquid material 42.

FIG. 26 illustrates a twenty-first embodiment of this invention. The twenty-first embodiment is very similar to the twentieth embodiment of the invention. However, as illustrated within FIG. 26, the first or forward segment 94 to contact the piston 40 may actually be more dense or stiffer than successively contacted or expelled segments, such as segment 96. Please note that the cross-sectional shading used within many of the drawings, as related to the non-liquid material 42, is used to indicate the relative density of the segments 94, 96 and 98. Generally, the more compact the cross-sectional shading, the greater amount of density will be had with that segment 94, 96 or 98.

FIG. 26 also illustrates at one or more of the segments 94, 96 and/or 98 may be shaped to seat into one-another. Within the twenty-first embodiment of this invention, the segment 94 has a generally conical shape directed inwardly toward segment 96. Segment 96 is correspondingly shaped to receive the conical shape of segment 94. It is intended that such shapes for segments 94, 96 and/or 98 will impart a smoother transition of forces between successive segments of non-liquid material 42.

FIG. 27 illustrates a twenty-second embodiment of this invention, wherein a rod-like segment 142 of non-liquid material 42 is placed concentrically and colinearly within a tubular-shaped segment 144 of the same or different density of non-liquid material 42. The segment 142 will compress or yield, while the less dense segment 144 is being extruded.

FIG. 28 illustrates a twenty-third embodiment of this invention, wherein the first or leading end or face 58 of the piston 40 is ramped or angled as shown in FIGS. 9, 10 and 11. A varying slope of the leading end or face 58 of the piston 40 will affect the ejection loading of the apparatus 34.

The varying nose shapes for the first or leading end or face 58 of the piston 40 can cause a different ejection load behavior for the apparatus 34.

FIG. 29 illustrates a twenty-fourth embodiment of this invention, wherein the first or leading end or face 58 of the piston 40 has a generally bullnosed or convex shape.

FIG. 30 illustrates a twenty-fifth embodiment of this invention, wherein the first or leading end or face 58 of the piston 40 has a generally indented or concave shape.

FIG. 31 illustrates a twenty-sixth embodiment of this invention, wherein the first or leading end or face 58 of the piston 40 has a generally bullet or oval shape.

FIG. 32 illustrates a twenty-seventh embodiment of this invention, wherein the first or leading end or face 58 of the piston 40 has a generally biconical or knob shape.

FIGS. 33 and 34 illustrate a twenty-eighth embodiment of the present invention, wherein the piston 40 is provided with one or more of a variety of different grooves or slots 146, 146' and/or 146" therein. Please note that if the outer sidewalls 72 of the piston 40 are flush against the inner sidewalls 74 of the housing 36, portions or segments 62 of the non-liquid material 42 may be sheered and severed at or near the holes, apertures, orifices, channels and/or slots 44. Consequently, such portions or segments 62 might be expelled away from the apparatus 34. To prevent such expulsion of segments 62, the grooves or slots 146, 146' and/or 146", or a variation thereof, may be provided to retain such segments 62. In essence segments 62 would be retained or connected to at least a portion 148 of the non-liquid material 42 that remains within the enclosure 38.

FIG. 35 illustrates the twenty-eighth embodiment of this invention with the additional use of a capturing and/or retaining membrane 150 which is wrapped and/or encompassed thereabout. Membrane 150 may be formed from netting, fabric, plastic, or any other capturing and/or retaining material. Any appropriate means 152 for securing the membrane 150 to the housing 36 may be used. For example securing means 152 may comprise a band, a clamp, tape, adhesive, or any other structure that would accomplish the purposes as taught herein. The purpose of the membrane 150 and securing means 152 is to prevent or restrict the rapid expulsion of the segments 62 from the apparatus 34.

Alternatively, the housing 36, enclosure 38 and surrounding area of the apparatus 34 can be encased in an injection molded casing. Consequently, when the non-liquid material 42 is expelled from the apertures, orifices, channels and/or slots 44, such segments 62 can be captured and retained by the outer, surrounding, molded casing.

FIG. 36 illustrates a twenty-ninth embodiment of this invention, wherein a cable 154, such as a metal or nylon cord or wire, is formed integrally within the non-liquid material 42. It is the intention of the inventor, that within this embodiment of the invention the segments 62 will be at least partially retained by their integral formation with the cable 154 upon and/or after their extrusion from the housing 36.

FIG. 37 illustrates a thirtieth embodiment of this invention, wherein a thin tube or segment of sheet material forms an interior sleeve 156 which is juxtaposed or urged against the inner sidewalls 74 of the housing 36. For example, but not by way of limitation, the interior sleeve 156 may be formed of thin gage aluminum foil. The sleeve 156 provides a controlled, temporary blockage of the apertures, orifices, channels and/or slots 44 until a pressure within the enclosure 38 reaches a predetermined value. Once such a predetermined pressure value is reached, the sleeve 156 fails or ruptures to permit the extrusion of the non-liquid material 42 through the apertures, orifices, channels and/or slots 44.

The means and construction disclosed herein are by way of example and comprise primarily the preferred and several alternative forms of putting the invention into effect. Although the drawings depict the preferred and several alternative embodiments of the invention, other embodiments are described within the preceding and following text.

One skilled in the art will appreciate that the disclosed apparatus and devices may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its various forms, including all modifications, equivalents and alternative embodiments which fall within the legitimate and valid scope of the claims, appropriately interpreted under the Doctrine of Equivalents.

INDUSTRIAL APPLICABILITY

The present invention may be used in any industry, occupation or sport that would benefit from simple, reliable, easily used apparatus and/or methods for isolating and absorbing energy associated with shock forces. Notwithstanding the foregoing generality, the present invention is primarily intended to be used in the construction and/or retro-fitting of highway barriers, automobiles and commercial trucks.

Other applications for the invention can easily be found. For example as explained above, the present invention may be used within building construction and/or within the railroad, boating, shipping, commercial ferry, aeronautical, road barrier, lunar landing and in other industries and applications. The present invention has a special benefit of being applicable to a wide variety of different applications that significantly broaden the scope, versatility and universability of the apparatus. In essence, the present invention could be used in nearly every instance wherein an object will be subjected to an isolated or repetitive shock or impact force.

Notwithstanding the previous sentence, the preferred embodiment of this invention is intended to protect an object that is subjected to a one-time, serious, impact load or force.

The apparatus of this invention is compact, unobtrusive, efficient, durable, rugged, is easily constructed, and is inexpensive and economical to manufacture, install, repair and replace.

Traditional and/or nontraditional manufacturing apparatus and procedures may be used to manufacture the apparatus of the present invention. The purposes of this invention as taught herein may be achieved without necessarily requiring any significant alteration to either the manufacturing machinery or to the object to which the apparatus will be attached.

The simplification and elimination of numerous hydraulic and pneumatic parts from existing shock absorbing apparatus, that were heretofore thought essential for proper operation of the apparatus, is a dramatic improvement over the construction, installation, operation, maintenance, repair and replacement of previous devices intended to absorb shock energy and impacts.

Once manufactured, the apparatus of the present invention can be easily transported and stored using a minimum amount of space. Consequently, the invention minimizes the packaging size and cargo space required to contain and ship the apparatus. This in turn, reduces transportation and storage costs for suppliers and vendors. Since hydraulic and pneumatic apparatus are not used within the present invention, the suppliers and vendors need not worry about leaking or dusty cylinders or the fire hazards associated therewith. Furthermore, the complexity and weight of the apparatus of the present invention will be dramatically smaller than what was heretofore thought possible to accomplish the intended purposes.

OTHER EMBODIMENTS

FIGS. 38 and 39 illustrate another embodiment of this invention. This embodiment includes an energy absorbing apparatus 200 that utilizes an arcuate piston stroke. As shown in FIG. 38, the energy absorbing apparatus 200 includes housings 202 that each include two spaced, parallel plates 204, 206. The plate 206 supports a mounting block 208, and an outer plate 210 is secured to the plates 204, 206 to form an enclosure within the housing 202. The plate 204 forms an array of openings 212, each passing completely through the plate 204 along a respective opening axis 214. The plates 204, 206 support a pivot 216 centered on a pivot axis 218. A segment of solid material 220 is disposed in the enclosure of each housing 202. As shown in FIG. 38, the opening axes 214 are parallel to the pivot axis 218, and the plate 204 is oriented generally perpendicularly to the pivot axis 218.

One edge of the enclosure of each housing 202 is formed by a piston 222 that is pivotally mounted to the housing 202 to move along an arcuate stroke, indicated schematically by the arrow 224. This arcuate stroke for this particular embodiment extends over an arc of at least 45 degrees, more preferably over an arc of at least 60 degrees, and most preferably over an arc of 90 degrees. Each piston 222 is rigidly connected to a respective lever arm 226 that in this embodiment extends downwardly from the respective housing 202. Other embodiments may use a smaller or a larger arcuate stroke. For example, in some embodiments the arcuate stroke may extend over 10 degrees or less.

As shown in FIG. 38, two of the housings 202 are secured to respective rails 230 of a vehicle 228 by threaded fasteners 232. In the mounted configuration, the lever arms 226 extend-downwardly in spaced parallel relationship, and the openings 212 are not blocked by the rails 230. The lever arms 226 are connected in this embodiment to a bumper 234. The bumper 234 includes two parallel sleeves 236, each shaped to receive a respective one of the lever arms 226. Springs 238 bias the sleeves 236 outwardly, and fasteners 240 pass through slots 242 to adjustably secure the sleeves 236 in place on the lever arms 226.

FIG. 38 shows one of the pistons 222 in an initial position, before the segment of solid material 220 has been deformed. FIG. 39 shows the energy absorbing apparatus 200 after the bumper 234 has been deflected, thereby causing the lever arm 226 and the piston (not shown in FIG. 39) to pivot about the pivot 216. As the piston pivots about the pivot 216, the piston applies compressive forces to the segment of solid material as it moves through the arcuate stroke. The openings 212 are positioned to extend along the stroke such that the piston moves past at least some of the openings as the piston moves through the stroke. Compressive forces applied by the piston to the segment of solid material 220 cause it to flow through the openings, as shown in FIG. 39.

The comparatively compact housing 202 provides a proportionately greater stroke in certain applications. It provides a compact mounting footprint for example on the frame of a truck as illustrated. By suitably dimensioning lever arms 226, a desired level of leverage can easily be obtained. The energy absorbing apparatus 200 can be simply refurbished after use, since the housing can be disassembled to remove the old solid material 220 and install a new segment. The energy absorption apparatus 200 of FIGS. 38–39 is anticipated to provide substantial advantages as a device for protecting an impacting object from underriding a truck. The apparatus 200 is highly tunable and field replaceable.

As explained above, a wide variety of materials can be used for the segment of solid material 220, and any suitable mechanical structure can be used to form the housing 202, the pivot 216, and the piston 222. Any suitable materials can be used for the various components, and these components can be held together in any suitable manner, as for example by welding, forming, or fastening, including adhesive fastening. The openings 212 can be arranged in any suitable configuration, they may vary in size, spacing and placement and they do not have to be circular. If desired, slots can be substituted, or openings can be provided with other shapes. Further control of the performance of the system can be exercised by varying the solid material 220 to select desired parameters such as density, stiffness, compressive strength, shear strength and/or tensile strength. Furthermore, the energy absorbing apparatus 200 can readily be adapted for other applications, and the piston 222 does not have to be connected to a bumper 234 in all applications.

FIGS. 40 through 45 relate to additional embodiments of this invention that are well suited to operate in tension. As shown in FIG. 40, an energy absorbing apparatus 300 includes a housing 302 that in this embodiment comprises a metal tube 304 that forms a rigid cylinder. The tube 304 includes a closed end 306, and an opposed end that supports an eye bolt 308. A piston 310 is mounted to slide within the tube 304, and the piston 310 is secured to a tension member 312. The tension member 312 passes through an enclosure 314 formed by the tube 304, out the closed end 306 of the tube 304. The enclosure 314 is substantially filled with a solid material 316, which may be any of the materials discussed above. Multiple openings 318 are formed in the walls of the tube 304, between the piston 310 in its initial position and the closed end 306.

In operation, the piston 310 is initially placed adjacent to the inner end of the eye bolt 308. Forces are applied to the eye bolt 308 and the tension member 312 to move the piston 310 away from the eye bolt 308. This causes the piston 310 to move along a stroke, indicated schematically by the arrow 320. As the piston moves along the stroke 320, the piston 310 moves past successive ones of the openings 318 as it applies compressive forces to the solid material 316 and forces the solid material to flow through the openings 318. FIG. 40 is to some extent schematic, and it should be understood that any suitable arrangement can be used for applying the desired forces to the housing 302 and the piston 310. The tension member can include a cable, rod, strand or the like, and any suitable materials and any suitable size and arrangement of openings and other components can be used. For example, the tube 304 may alternately be formed of composite or polymeric materials.

FIGS. 41–43 illustrate an energy absorbing apparatus 330 that uses a cable 332 as a tension member to motivate a piston 334 that is disposed in a rigid cylindrical housing 336. The housing 336 defines a closed end 338 through which the cable passes, and mounting flanges 340. The housing 336 defines a longitudinally extending slot 342 through which the solid material 344 is forced as the piston 334 is moved along its stroke in the housing 336. FIG. 42 shows the energy absorbing apparatus in an initial position, in which the piston 334 is positioned at one end of the housing 336. FIG. 43 shows the energy absorbing apparatus 330 after the cable 332 has been used to move the piston 334 toward the end 338, thereby forcing solid material 344 out of the slot 342. The energy absorbing apparatus 330 operates in a manner similar to that described above in conjunction with FIG. 40, and many of the alternatives discussed in conjunction with FIG. 40 apply to the embodiment of FIGS. 41–43 as well.

FIGS. 44 and 45 relate to another energy absorbing apparatus 350 that also uses a tension member such as a cable 352 connected to a piston 354 to apply compressive forces to a solid material 356.

In this embodiment the housing comprises a flexible mesh tube 358 that may for example comprise braided metal strands 360. The tension member 352 passes through a central opening in a fitting 362 that is crimped in place on one end of the mesh tube 358. The other end of the mesh tube 358 is crimped to a second fitting 364, through which passes a second tension member 366. The second tension member 366 includes an enlarged end 368 that will not pass through the fitting 364. The fittings 362, 364 may be similar to fittings used for the fabrication of hydraulic hoses. Basically, each fitting 362, 364 includes an inner and an outer annulus that receive the respective end of the mesh tube therebetween. Then a crushing tool deforms the fittings 362, 364 to secure the mesh tube 358 between the inner and outer annular portions of the fittings 362, 364.

FIG. 45 shows the assembled energy absorbing apparatus 350. When tensile forces are applied between the tension members 352, 366, the piston 354 is moved toward the fitting 362, thereby forcing the solid material 356 to move through interstitial openings 370 formed between the braided metal strands 360 of the mesh tube 358. In this way, the piston 354 is caused to move past the openings 370 as it moves through its stroke and applies compressive forces to the solid material 356.

The energy absorbing apparatus 350 is flexible, and well-suited for use as a shock isolator in a cable or other tension member. Preferably, the solid material 356 is flexible and can be formed of a suitable rubber or other elastomer, for example. Alternately, the solid material 356 can be formed of plastic or other polymeric material. The mesh tube 358 operates in tension to the left of the piston 354 and in a combination of pressure loading and tension loading to the right of the piston 354.

As before, any suitable materials, proportions and modifications can be used in the energy absorbing apparatus 350. The flexible mesh tube 358 may be formed of metallic or other fibrous woven materials. In some applications, the flexible mesh tube 358 may be placed around a rigid housing that forms openings. In this alternative the flexible mesh tube is only a part of the housing, and the mesh tube shares radial loads with the rigid housing contained therein. In this way, a thin-wall housing may be adequate.

The energy absorbing apparatus 350 provides the advantage of attenuation of an initial force spike. This is because the mesh tube 358 will typically expand somewhat before material is ejected through the interstitial openings 370 by the piston 354.

FIGS. 46–50 relate to another energy absorbing apparatus 400 that incorporates an embodiment of this invention. The energy absorbing apparatus 400 includes a housing 402, that in this embodiment includes a rigid cylindrical tube that forms an axially extending slot 404. One end of the tube is closed, as shown at 406. A piston 408 is mounted in an enclosure defined by the housing 402 to move along an axial stroke. This piston 408 defines a piston face 410 and a piston opening 420 extending through the piston face 410. A segment of solid material 422 is disposed in the housing 402 between the piston face 410 and the closed end 406.

As shown in FIG. 47, in this embodiment the piston opening 420 is centered in the piston face. As shown in FIG. 46, the piston opening 420 defines a substantially constant cross-sectional area along its length.

FIGS. 49 and 50 show the energy absorbing apparatus 400 in use, with the piston 408 moved partially along its stroke.

Note that the piston face 410 is oriented at an oblique angle with respect to the stroke, and the face 410 is positioned to force the solid material 422 toward the slot 404. As shown in FIG. 49, parts of the solid material 422 are moved out of the enclosure via the slot 404, and other parts of the solid material are moved out of the enclosure via the piston opening 420.

The energy absorbing apparatus 400 is designed to work effectively both at relatively high operating temperatures and at relatively low operating temperatures. At relatively high operating temperatures the solid material 422 provides a flow behavior that allows substantially all of the material to leave the enclosure via the slot 404. Some of the solid material will enter the piston opening 420, but frictional restraint loads offered by the walls of the piston opening 420 prevent any substantial volume of solid material from moving through the piston opening 420. In particular, the warm solid material is expected to balloon into high-friction contact with the side walls of the piston opening 420 as it moves away from the piston face 410. This high-friction contact will prevent the flow of further solid material through the piston opening. During low temperature operation, the ratio of axial loads to radial loads increases, and the piston opening 420 is preferably dimensioned to allow the flow of solid material through the piston opening 420 under low temperature conditions. The cold solid material is stiffer and has less of a tendency to move into high-friction contact with the side walls of the piston opening 420 as it moves away from the piston face. In this way, the load required to eject the solid material from the enclosure is reduced, as compared to the load that would be required if all of the solid material were ejected from the enclosure via the slot 404. The ratio of the length of the piston opening 420 to the maximum cross-sectional dimension of the piston opening 420 can be 1, 2, 3, or other values, as suitable for the particular application.

FIGS. 51 through 53 relate to another energy absorbing apparatus 450 that is quite similar to the apparatus 400 described above. The principal difference is that the piston opening 452 is positioned off-center on the piston face 454, on the opposite side of the piston center from the slot 456. Also, the piston opening 452 in this embodiment is tapered, and it has a smaller cross-sectional area near the piston face 454 and a larger cross-sectional area at positions more distantly spaced from the piston face 454. Any suitable taper can be used, whether linear, nonlinear, or stepped. The advantage of such a tapered piston opening 452 is that it provides reduced high-friction contact with low temperature solid material, which has a reduced tendency to swell to fill the larger cross-sectional area of the downstream piston opening.

As an example, the piston opening 452 can have an initial or a smallest diameter of 0.5 inches and can have a length of 3 inches. Such a piston opening 452 with an appropriate solid material will choke off flow of the solid material through the piston opening at 72° F. after only a relatively small volume of solid material has entered piston opening 452, whereas at a temperature of −20° F. there will be no tendency for the flow to be choked off after a certain volume of solid material has entered piston opening 452. In this way, the operating forces generated by the energy absorbing device 450 are made less temperature dependent. The foregoing dimensions are only exemplary, and other diameters and lengths can be used.

As before, many variations are possible. For example, one or more openings can be provided in the piston face, and these openings can be positioned as desired on the piston face, shaped as desired and tapered as desired. When a taper is used for the piston opening, it can be tapered in either direction. Furthermore, the surface of the piston face and piston opening can be textured as desired to provide the desired frictional characteristics. For example, surface roughness, surface pitting, surface ridges or surface rifling can be used as appropriate.

Many variations are possible to the foregoing examples. Dimensions, proportions and layouts may all be adapted for the particular application. The piston may be motivated by on-center or off-center loads that are applied either in tension or compression. Selected elements of the foregoing examples may be combined. For example, the arcuate stroke embodiment of FIGS. 38–39 may be modified to operate in tension, or to use a ported piston. Similarly, the embodiments of FIGS. 40–45 may be modified to use a ported piston.

The foregoing detailed description has discussed only a few of the many alternative forms that the present invention can take. For this reason, this detailed description is intended only by way of example, not limitation. It is only the following claims, including all equivalents, that are intended to define the scope of this invention.

I claim:

1. An energy absorbing apparatus comprising:
   a housing defining an enclosure;
   at least one segment of solid material in the enclosure;
   a piston extending into the housing to apply compressive forces to the solid material as the piston moves along a stroke;
   said housing comprising at least one opening that extends along the stroke such that the piston moves past at least a portion of the opening as the piston moves along the stroke, said piston operative to urge the solid material to flow through the opening as the piston moves along the stroke;
   wherein the stroke is arcuate in shape.

2. The invention of claim 1 wherein a piston is mounted for rotary movement in the housing about a pivot.

3. The invention of claim 2 further comprising a lever arm secured to the piston.

4. The invention of claim I wherein each at least one opening is oriented along a respective opening axis, wherein the piston pivots about a pivot axis, and wherein the pivot axis is substantially parallel to the opening axes.

5. The invention of claim 1 wherein the housing comprises a plate oriented substantially transverse to a pivot axis, wherein the piston pivots about the pivot axis, and wherein the at least one opening is in the plate.

6. The invention of claim 1 wherein the housing is secured to a vehicle, and wherein the piston is secured to a bumper of the vehicle.

* * * * *